United States Patent
Clark et al.

(10) Patent No.: US 12,182,742 B1
(45) Date of Patent: Dec. 31, 2024

(54) METHOD FOR THE STANDARDIZED PRODUCTION, FINANCING AND DELIVERY OF HOUSING USING A DISTRIBUTED LEDGER TECHNOLOGY AND DECENTRALIZED ARTIFICIALLY INTELLIGENT CYBER-PHYSICAL SYSTEM

(71) Applicants: Preston Clark, Santa Monica, CA (US); Irena Raskin, Los Angeles, CA (US)

(72) Inventors: Preston Clark, Santa Monica, CA (US); Irena Raskin, Los Angeles, CA (US)

(73) Assignee: JBD HOLDINGS LLC, Sheridan, WY (US)

( * ) Notice: Subject to any disclaimer, the term of this patent is extended or adjusted under 35 U.S.C. 154(b) by 200 days.

(21) Appl. No.: 17/580,852

(22) Filed: Jan. 21, 2022

Related U.S. Application Data

(60) Provisional application No. 63/140,089, filed on Jan. 21, 2021.

(51) Int. Cl.
| | |
|---|---|
| *G06Q 10/0631* | (2023.01) |
| *G06Q 30/018* | (2023.01) |
| *G06Q 50/18* | (2012.01) |
| *G06N 20/00* | (2019.01) |
| *H04L 9/00* | (2022.01) |

(52) U.S. Cl.
CPC . *G06Q 10/06313* (2013.01); *G06Q 10/06316* (2013.01); *G06Q 30/018* (2013.01); *G06Q 50/18* (2013.01); *G06N 20/00* (2019.01); *G06Q 2220/00* (2013.01); *H04L 9/50* (2022.05)

(58) Field of Classification Search
CPC ....... G06Q 10/06313; G06Q 10/06316; G06Q 30/018; G06Q 50/18; G06Q 2220/00; G06N 20/00
See application file for complete search history.

(56) References Cited

U.S. PATENT DOCUMENTS

| | | | | |
|---|---|---|---|---|
| 7,835,934 | B2 * | 11/2010 | Gundersen | G06Q 10/10 705/7.42 |
| 9,611,637 | B2 * | 4/2017 | Dynon | E04B 1/34815 |
| 11,386,373 | B2 * | 7/2022 | Itou | G06Q 10/06393 |
| 2002/0153134 | A1 * | 10/2002 | Newman | E21B 41/00 166/53 |
| 2011/0035245 | A1 * | 2/2011 | Nielsen | G06Q 10/0633 705/7.27 |
| 2022/0405775 | A1 * | 12/2022 | Siebel | G06Q 30/0202 |
| 2023/0135553 | A1 * | 5/2023 | Cella | B33Y 10/00 |

* cited by examiner

*Primary Examiner* — Dylan C White
(74) *Attorney, Agent, or Firm* — RISSO I.P.

(57) ABSTRACT

This disclosure provides a method for the standardized production, financing and delivery of housing using distributed ledger technology and a decentralized artificially intelligent cyber-physical system (CPS or invention) for compiling data and executing human and deep learning sequences for the purposes of standardizing the planning and execution of real estate development, regulatory compliance, financing, supply chain procurement, industrial manufacturing processes, logistical processes as well as project management tasks, and other various construction, manufacturing and delivery tasks and procedures to standardize development, production, and delivery of standardizes building modules and standardized building components in a standardized smart factory that are used to assemble structures.

17 Claims, 16 Drawing Sheets

FIG. 1B

| | | | | PARTY TYPE | | | | |
|---|---|---|---|---|---|---|---|---|
| Customer | End User | Regulators | Bank | Development Workforce | Production Workforce | Delivery & Logistics Workforce | On-site Workforce | Supply Chain Workforce |
| Structure / Completed Building | Structure / Completed Building and Value | Speed, Efficiency | Speed, Efficiency, Value | Structure / Completed Building | Building Module | Speed, Efficiency, Value | Speed, Efficiency, Value | Speed, Efficiency, Value |
| Real property/land | Structure use | Standards | Collateralized Asset | Speed, Efficiency, Value | Jobs, Income, Factory, Safety | Jobs, Income, Equipment, Safety | Jobs, Income, Tools, Safety | Jobs and Income |
| Speed, Efficiency, Value | Affordability | Compliance | Real property/land | Real property/land | Regulatory, Material and Skill Certification | Regulatory, Material and Skill Certification | Regulatory, Material and Skill Certification | Building Components |
| Size per Structure and Unit | Flexibility | Point of Origin | Structure / Completed Building | Jobs and Income | Allowable Price and Price Principles | Building Module | Building Component | Material Certification |
| Specifications for Building Module and Structure | Quality and Maintenance | Uniquely Identifiable & Trackable | Allowable Cost and Cost Principles | Allowable Price and Price Principles | Activities Allowed or Unallowed | Allowable Price and Price Principles | Building Modules | Tracking |
| Capital, Cash Management and Accounting | Safety | Verification | Activities Allowed or Unallowed | Cash Management and Accounting | Cash Management and Accounting | Activities Allowed or Unallowed | Allowable Price and Price Principles | Analysis and Predictability |
| Project Plan and Reporting | Sustainability | Analysis and Predictability | Cash Management and Accounting | Regulatory, Material and Skill Certification | Analysis and Predictability | Cash Management and Accounting | Activities Allowed or Unallowed | Activities Allowed or Unallowed |
| Allowable Cost and Cost Principles | Activities Allowed or Unallowed | Archive | Audit and Period of Performance | Analysis and Predictability | Quality | Analysis and Predictability | Cash Management and Accounting | Cash Management and Accounting |
| Quality and Maintenance | Alerts and Reporting | Alerts and Reporting | Alerts and Reporting | Alerts and Reporting | Alerts and Reporting | Alerts and Reporting | Analysis and Predictability | Multi-point delivery |

(Left-side vertical label: INTEREST)

FIG. 4

| | TYPE | | | | |
|---|---|---|---|---|---|
| Real World | Building Component/ Material | Testing | Building Module to Structure | Regulatory | Financial |
| Soil Classification | Inorganic material | X-Ray | Water penetration | Delegation of Authority | Classification |
| Land History | Organic material | Environmental Analysis | Functional Use | Standards | Allowable Cost and Cost Principles |
| Area Medium Income (AMI) | Composite material | Compressive Strength | Augmented Reality (AR) | Compliance | Allowable Price and Price Principles |
| Jurisdiction Exam | Source/Origin | Maximum Area of Reinforcement | Virtual Reality (VR) | Interpretation of Regulations (IR) | Qualification |
| Building Component Exam | Tensile Strength | Load Combinations | Utility Service | Inspection Interval | Award – Activities Allowed or Unallowed |
| Welding Data | Yield Point | Dye Penetrant (DT) | RFID | Change Order | Cash Management and Accounting |
| Building Component Inventory Level | Dimension | Tension | Performance | Expiration | Audit and Period of Performance |
| Use Factors | Weight | Creep | Assembly | Certification | Procurement |
| Environmental Factors | Elongation Percentage | Visual (VT) | Substation | Escalation | Real Property Owner |

(MODIFY)

METHOD FOR THE STANDARDIZED PRODUCTION, FINANCING AND DELIVERY OF HOUSING USING A DISTRIBUTED LEDGER TECHNOLOGY AND DECENTRALIZED ARTIFICIALLY INTELLIGENT CYBER-PHYSICAL SYSTEM

CROSS-REFERENCE TO RELATED APPLICATIONS

This is a non-provisional application of U.S. Provisional Application No. 63/140,089, filed on Jan. 21, 2021, the entirety of which is incorporated herein by reference.

TECHNICAL FIELD OF INVENTION

The present invention is related to a standardized housing production system and, more specifically, to an automated cyber-physical production system that incorporates data from various sources to generate a standardized work order (STANWO) for the standardized (automated) production, manufacturing and delivery of building modules.

BACKGROUND OF INVENTION

The housing market has failed to produce affordable housing at the scale and speed demanded by consumers, as evidenced by homelessness, sub-standard housing with poor access to basic services, and key segments of society being unable to afford to live near to their place of work. In other words, the housing market does not deliver housing efficiently and equitably.

The reasons for the failures are multi-faceted: the construction industry is extensively regulated, subject to everything from permits and approvals to safety and work-site controls, and lowest-price rules in tenders make competition based on quality, reliability, or alternative design offerings more complicated; bespoke projects with unique features and varying topology have a limited degree of repeatability and standardization; each project involves many steps and companies with scattered accountability, which complicates the coordination, substantially increasing costs; contractual structures and incentives are misaligned; risks are often passed to other areas of the value chain instead of being addressed, and participants make money from claims rather than from good delivery.

Further, the regulatory agencies have misaligned and inconsistent requirements for the affordable housing programs they administer resulting in a cumbersome approval process for developers who need state resources to support their projects. Because these developers must often use multiple sources of funding for their developments to be financially feasible, the misaligned requirements slow development and increase project costs. Projects often get stalled at the local level and there is no oversight from the state to ensure projects are facilitated and completed rather than stalled by local regulations having to do with density, design, building materials, setbacks, parking, lot size and location.

Governments play a critical role in supporting affordable housing development and private investment alone cannot achieve the needed amount of housing construction at costs that are affordable. Governments lack an effective approach to planning and financing development at both the state and local levels. Governments are unable to formulate a clear plan describing how or where its billions of dollars for housing will have the most impact nor can they effectively prepare or respond to natural or man-made disasters. And there is nothing in place, which facilitates a population level response in case of a natural or man-made disaster and governments have no way to prepare for an emergency, much less respond to one, be it Covid, a hurricane or the inability to house its population resulting in an ever-growing number of unhoused individuals and families.

There is no predictability and no transparency and there is no way to improve on the current system, which would make a large enough impact to spur the construction at the scale required to meet the population-level need. Governments cannot formulate housing plans explaining how state financial resources will contribute to meeting current and future housing need and identifying where those resources will have the most impact—highest and best use. Governments are also unable to identify sites suitable to accommodate the building modules needed and cannot take proper action to mitigate any barriers to development at the local level.

Everyone agrees that there is a problem, but no one knows how to solve it and therefore cities cannot generate any actionable plans. Worse yet, governments can only look to the past as a guide for the future and therefore can only project or define plans based on old data and outdated methods because planning based on untrustworthy, non-transparent, unknown, new methods or data is simply too unreliable.

A supply-side solution to the housing crisis is not achievable without the alignment of all stakeholders along the value chain (including public and private parties) and the standardization of the relevant processes, methods and products. Housing comes down to many individual and local choices and consequently there is a great need for a system to align the various needs around the core objective of meeting the housing need at scale in order to respond to the housing crisis as well as natural and man-made disasters.

Until now, there has never been a way to converge either the stakeholders or the technology in order to facilitate the standardized production, financing and delivery of housing. Governments and private parties had no way to interact at scale. Convergence of the technology facilitates the convergence and alignment of the stakeholders in one system where predictability, reliability and transparency are paramount and facilitate the standardized production, financing, manufacturing and delivery of housing at population levels to meet the needs of the community.

Additionally, the inability of governments to efficiently deploy funding and release land to support the creation of affordable housing has made projects reliant on private donors to fund projects as charitable donations, which keeps both governments and developers from having a steady, reliable and transparent way to finance housing projects.

Thus, a continuing need exists for cyber-physical system that incorporates the various needs of stakeholders into an efficient system that enables the standardized production of housing in a streamlined and efficient manner.

SUMMARY OF INVENTION

The present disclosure provides a decentralized artificially intelligent cyber-physical system for standardized production and delivery of building modules enabling the planning, regulatory and financing decisions to be based on the standardized output capacity. In one aspect, the system (also referred to as the "cyber-physical system") includes one or more processors and associated memory. The memory is a non-transitory computer-readable medium having executable instructions encoded thereon, such that upon execution of the instructions, the one or more processors perform several operations, such as receiving pre-defined objectives according to a master contract, the pre-defined objectives including at least standardized production of one or more standardized building modules; receiving, from a master knowledge generator, Workforce specific data as related to fulfillment of the pre-defined objectives; receiving, from an integrated knowledge base, real-property information related to fulfillment of the pre-defined objectives; generating a standardized work order (STANWO) recommendation for the Workforce based on the Workforce specific data and the real-property information; receiving production data on the Workforce while the Workforce is executing at least a portion of the STANWO recommendation; and updating an Electronic Building Component Master for the Workforce based on the production data.

In another aspect, the system performs an operation of causing one or more automated Workforce components to execute at least a portion of the STANWO recommendation by constructing one or more modular components for the one or more building modules.

In yet another aspect, the system causes one or more automated Workforce components to execute at least a portion of the STANWO recommendation includes an operation selected from a group consisting of causing a robotic system to weld two building components together, cutting building components, geographic movement of one or more building components, and painting one or more building components.

In another aspect, the system further comprises one or more computer process system (CPS) nodes, such that the one or more CPS nodes are operable for monitoring and generating production data for the one or more automated Workforce components.

In another aspect, the system performs an operation of altering the STANWO based on the production data and causing the one or more automated Workforce components to execute an altered STANWO.

In another aspect, the real-property information includes at least some of aggregated and verified geospatial information on jurisdictional zones, property lines, population information, and geospatial regulatory information.

Further, the master knowledge generator checks the personalized STANWO recommendation against a regulatory database to ensure regulatory compliance, such that if the STANWO is within regulatory compliance, then generating instructions to cause the one or more automated Workforce components to execute the at least a portion of the STANWO recommendation.

Additionally, one or more of the CPS nodes are emergency response sensors that, when activated, cause an emergency response system to activate a physical response to mitigate an emergency as sensed by the emergency response sensors.

In another aspect, the system includes computer-assisted acquisition (CAA) module, the CAA module operable for performing operations of: receiving parameters detailing a resource type used to acquire data; receiving parameters detailing a data type and condition of data to acquire; receiving performance information from a device to capture the data; transferring the data that has been captured to a processing module that allocates the data to a program (CAX) for machine learning and deep learning analysis; reporting on the data obtained using a report module; and archiving the data using an archive module.

In another aspect, the system includes decentralized computer-assisted processing (CAP) module, the CAP module operable for performing operations of: receiving parameters detailing computer resources needed to access additional data receiving parameters detailing a source and data type to acquire the additional data; receiving parameters detailing conditions to acquire the additional data; updating a Workforce data record in the private database with the additional data; transferring the additional data to other computer processing modules for machine learning and deep learning analysis and storage; reporting on the data using the report module; and archiving the data using the archive module.

The system also include a computer-assisted data operating algorithms (CAD) module, the CAD module operable for performing operations of: receiving parameters, from a computer-assisted program detailing the data, an machine learning and deep learning analysis of the data, a type of the data, a source of the data and logic needed to conduct decentralized artificial intelligence routines that extract abstract features from the data and augment decision making for building purposes; receiving parameters detailing the conditions to initiate the decentralized artificial intelligence routines; updating a Workforce data record with the additionally acquired decentralized artificial intelligence/deep learning information obtained; updating other databases within the computer infrastructure with the additionally acquired decentralized artificial intelligence/deep learning information obtained; updating the newly acquired decentralized artificial intelligence/deep learning information obtained to other computer processing modules for additional machine learning and deep learning analysis and storage; reporting on the machine learning and deep learning analysis and decentralized artificial intelligence/deep learning information obtained using the report module; and archiving the machine learning and deep learning analysis and decentralized artificial intelligence/deep learning information obtained.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1B. is a table illustrating the typical parties, and their typical interests and objectives for solving a housing crisis, and what the invention uses as data and feedback to analyze, predict and automatically transact a scalable population-wide standardized housing delivery method to solve a housing crisis;

FIG. 4 is a table depicting various types of decentralized resources;

DETAILED DESCRIPTION (1) Introduction

The present disclosure is directed to a standardized system and method for the delivery of housing, to the optimized design of housing and factory producing said housing, and to a decentralized, output-centered framework that emphasizes standardization, efficiency and quality using converged blockchain and AI technologies (as well as IoT, autonomous robotics, 3D printing as well as virtual and augmented reality) as part of a cyber physical system for the integration of the public and private stakeholders to facilitate the most efficient delivery of sustainable and resilient housing at population levels. The system also creates a "modular marketplace" where tokens for standardized building modules are bought, sold and exchanged as any other asset thereby democratizing the investment in affordable housing solutions and providing a platform that can allow for the funding of entire structures in advance, thereby changing the financing model from project to product. In other words, without the standardization facilitated by the system, there is little value and market to the building modules, which only have value currently once the structures are assembled on site (tied to land or installed). This marketplace is an entirely new way to finance real estate assets as products based on the modules produced rather than the finished structures or projects connected to land assets. In other words, the modules have value throughout at least four stages: (i) raw form, such as a structural frame or a shipping container that is not certified for habitable structures; (ii) a certified module (certified through a series of standardized work orders) for habitable structures; (iii) completed module that is not yet part of a finished structure; and (iv) completed module that is part of a finished structure. The platform tracks, validates and provides an audit trail of every module unit transaction in near-real time, allowing for greater transparency and increased automation and generates data, such as housing or building module or structure resilience data, as well as data on the use of public funds, otherwise unavailable entirely or unavailable at scale to government entities, regulators, banks, insurance companies, owners, tenants and other end users, etc. Further details are provided below.

(2) Specific Details of Various Embodiments

Figure 1A:
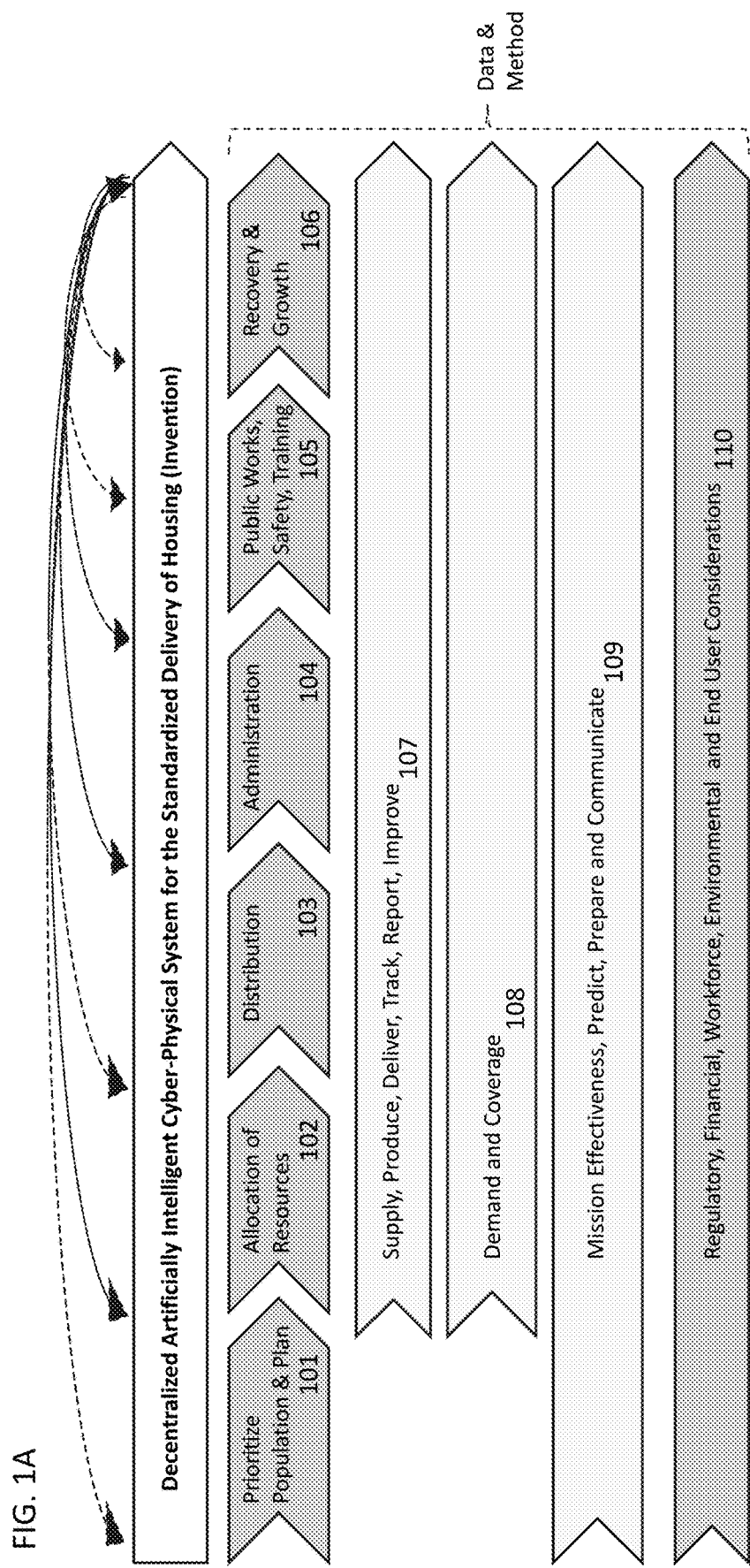
FIG. 1A. is a schematic diagram illustrating a housing plan with the typical elements a user of the invention would authorize, initiate and update using a decentralized artificial intelligent Cyber-physical System (CPS) for a population-wide standardized housing delivery method to solve a housing crisis.
Figure 7:
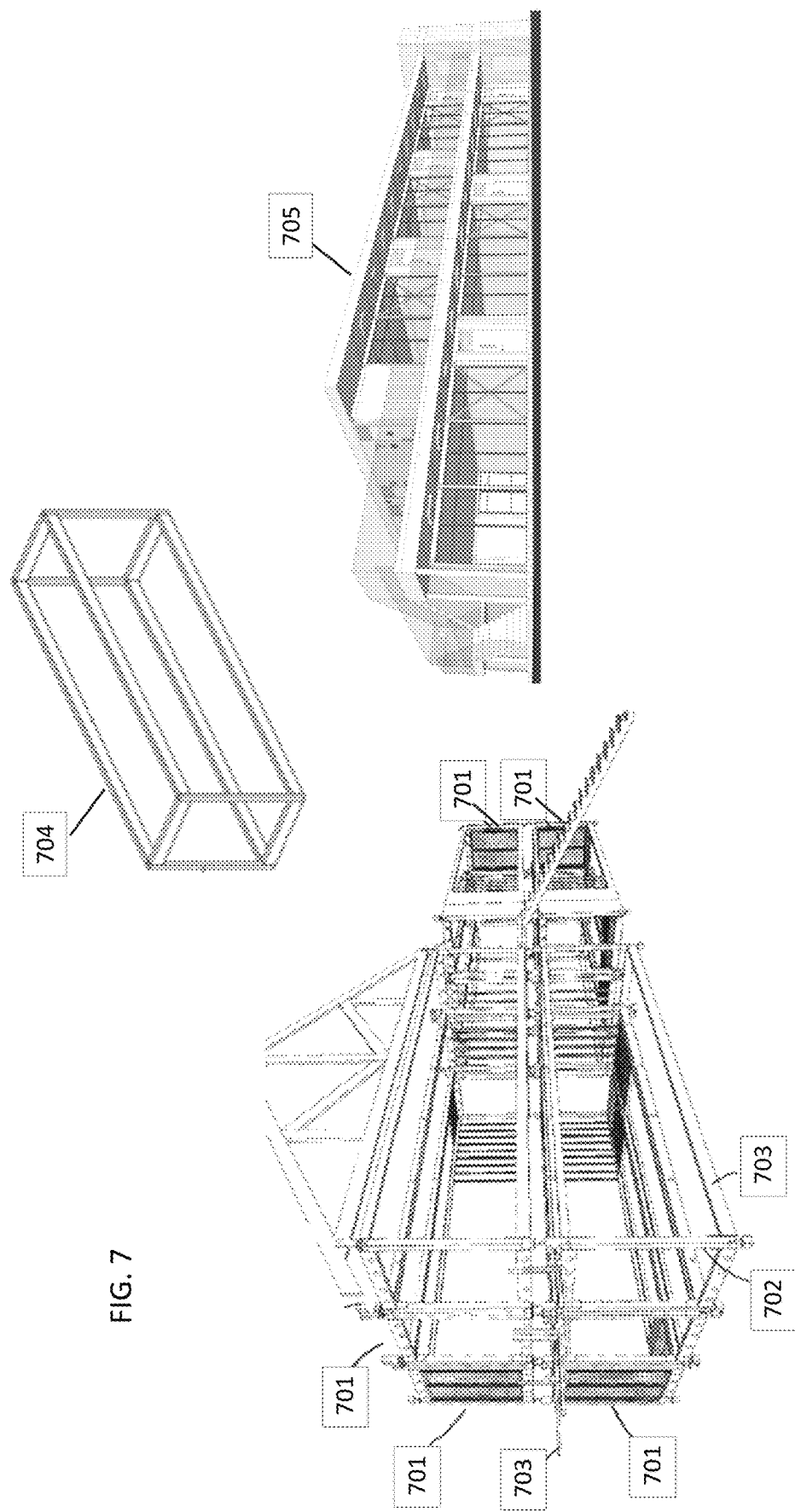
FIG. 7 is an illustration of the invention's output, or its product of value, the system and method creates, such as a building module, or a finished structure or building using building modules.

For further understanding of the invention, FIG. 1A. is a schematic diagram of a housing plan illustrating the typical elements the invention authorizes, initiates, or updates using a decentralized artificial intelligent Cyber-physical System (CPS) for a standardized housing delivery method and what considerations the user and CPS would analyze across and among one or more parties and workforce, with varying interests, for example shown in FIG. 1B. which illustrates an example of the typical parties and their typical interests and objectives for solving a housing crisis, and what the invention uses as data, and feedback to analyze, predict or authorize an automatic, semi-automatic or manual transact a scalable population-wide standardized housing delivery method to solve a housing crisis. A non-limiting example of this is the mechanical manifestation of artificial intelligence, such as autonomous robotics using decentralized CPS Node 2 or 5, produces the machine learning techniques to make decisions, by way of its decentralized Master Knowledge Generator 10, such as where to place a welding tack on a building module 704 or assemble a finished structure/building 705, including smart factories used for emergency response to a natural or man-made disaster, housing, schools, hospitals, emergency shelters, agriculture facilities and military structures, as illustrated in FIG. 7, and further herein, without having to be pre-programmed.

A unique aspect of the invention is how the system and method turn the current delivery of housing as project into a standardized, independently trackable product for the purposes of planning, financing, regulating, manufacturing, selling, or leasing. The mechanical processes transacted in the system, which remove the risk associated with regulatory, financial, safety and insurance standards, facilitate the outputs of the invention, such as building modules 704, to be treated as a product.

Figure 8:
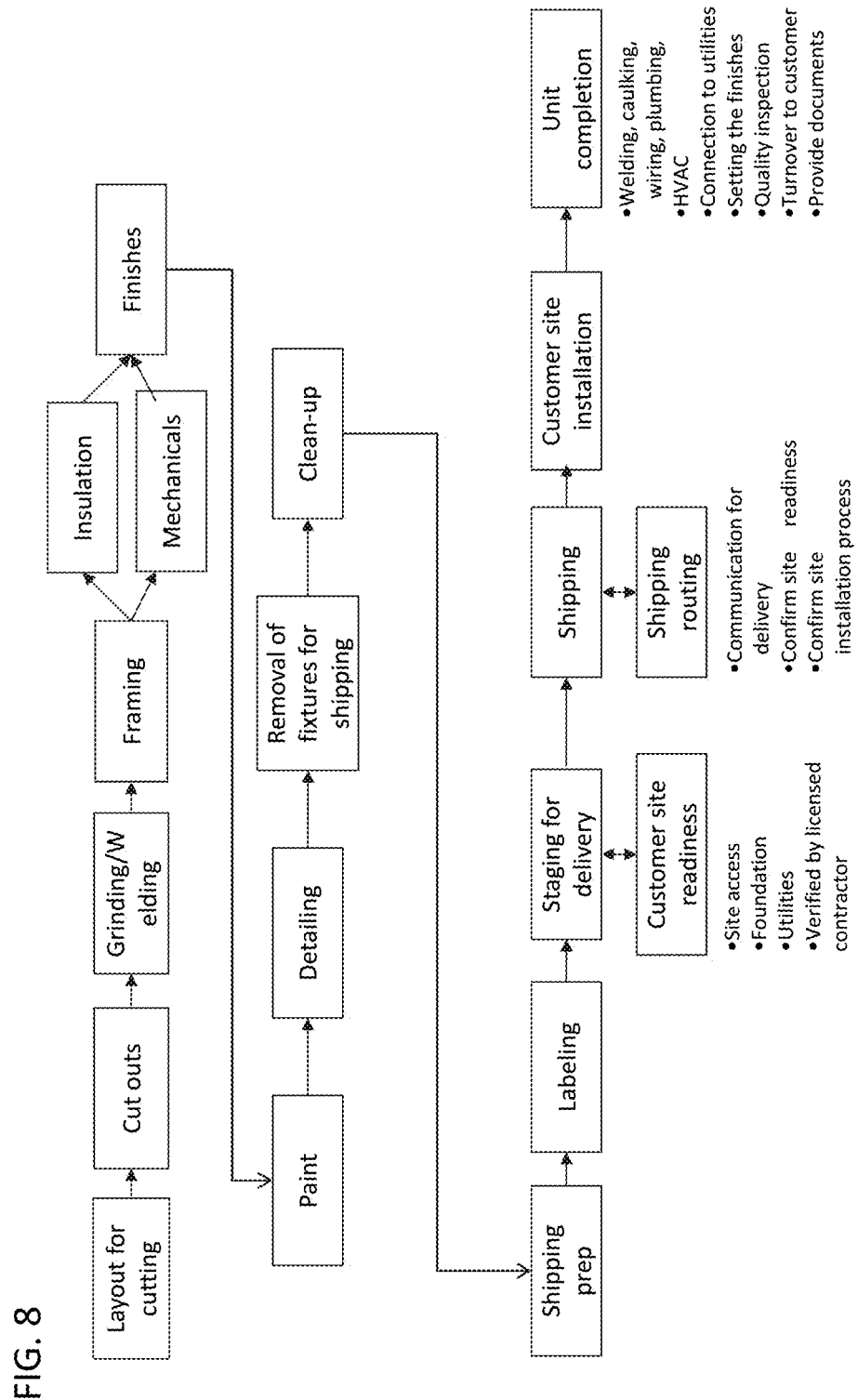
FIG. 8 is an illustration of a manufacturing process in a production facility used to make building modules and finished structures.
Figure 9:
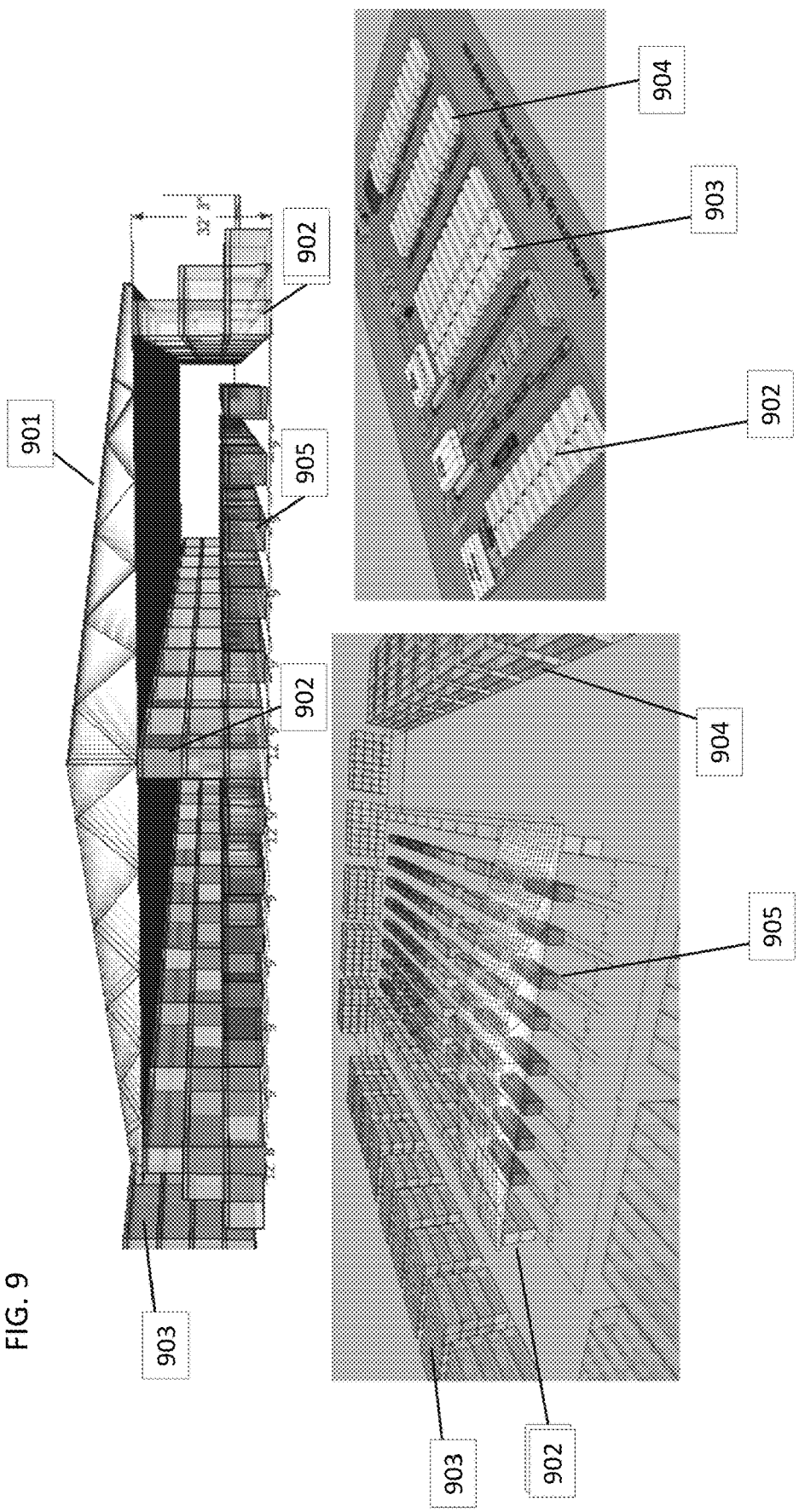
FIG. 9 is an illustration of a production facility used by the invention, that is made from finished building modules, and produces building modules, using the cyber-physical system and following the standardized delivery of housing method.
Figure 10:
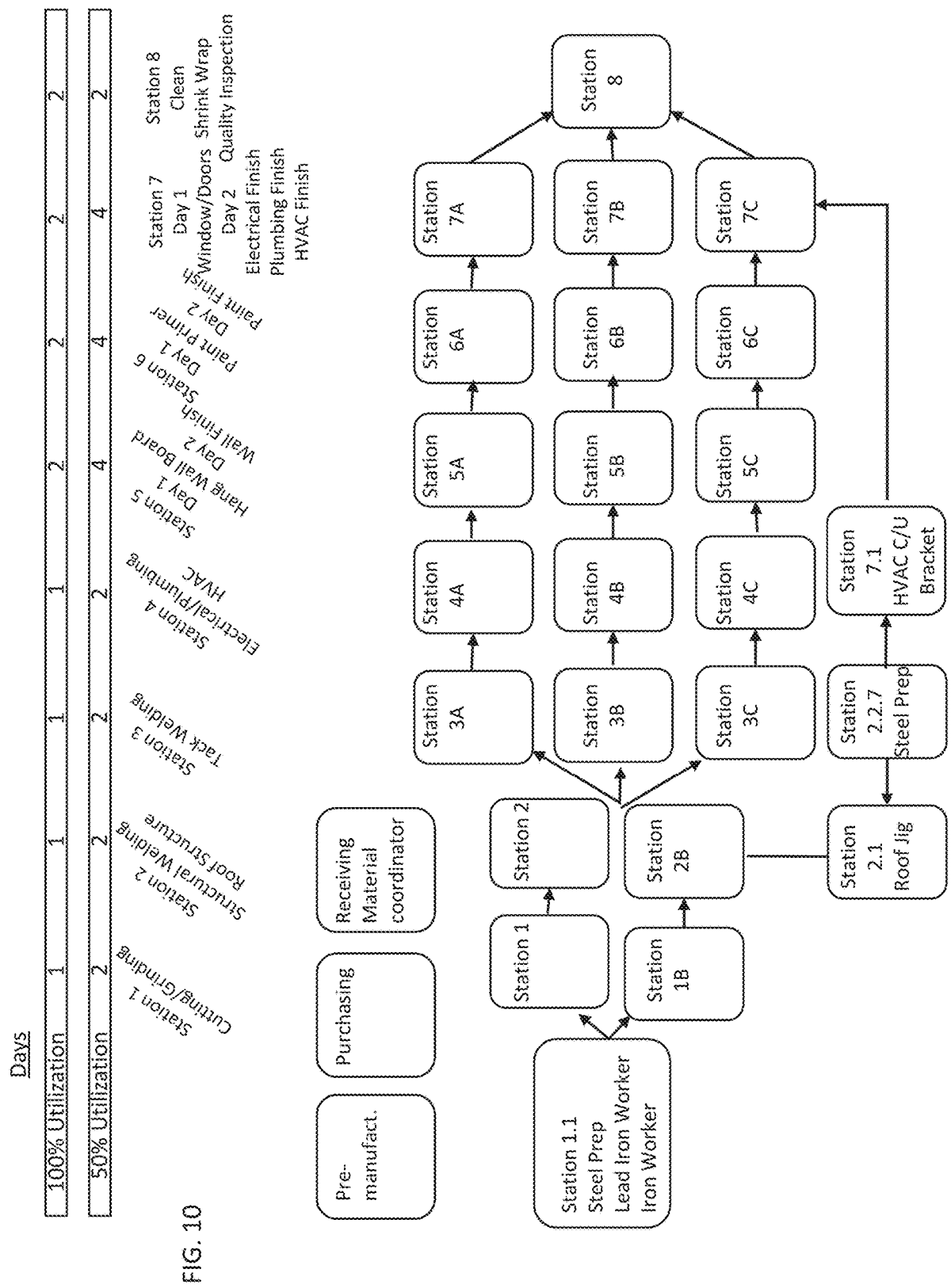
FIG. 10 is an additional illustration of a manufacturing process in a production facility used to make building modules and finished structures.

For a nonlimiting example of this, a building module 704, as defined by the invention, is a standardized unit of housing or structure capacity, that is uniquely traceable for financing collateral, regulatory approval and reporting, such as a building module that is standardized by the Housing and Urban Development agency (HUD), California's Housing and Community Development (HCD) or Division of the State Architect (DSA), or for a non-limiting example, is a third-party standardized, standardized ISO shipping container that is uniquely tracked or inspected for the purposes of identifying or certifying its point of origin, the material it was used to construct it, how long it has been in service, what locations it has been sent to, stored or plans to travel to, what regulatory authority is responsible for overseeing the third-party verification from the source material, its contents, the changes of contents, if there were any modifications to it, how long it is estimated to stay in service for its intended, current or future use, what inspection protocols need to be adhered to from international, national, state/provincial, and municipal governments or from agencies or organizations such as the United Nations, the Department of Defense, Coast Guard, Department of Transportation, FEMA, HUD, the State of California, Tennessee or Florida, the City or County of Los Angeles or other organizations such as the International Organization for Standardization (ISO), Wells Fargo & Company, The Blackstone Group, American Tower, a global Real Estate Investment Trust, The Salvation Army, a global non-profit dedicated to providing housing and shelters to those in need, a private individual or organization and others, that assign a particular value to the building module which may have a minimum of three production states, each with a varying degree of value assigned to it, as the non-limiting example illustrated in FIG. 9, where, a building module can be in its raw form 904, that has not started the fabrication modification process as defined in FIG. 8 or FIG. 10 but is still individually traceable and verifiable for an insurance company or Bank 120 to assign value to it for the purposes of financing collateral, which may be procured by a resource within the decentralized system, or outside the decentralized system, such as an ISO high cube shipping container that is 53 feet, 40 feet, or 20-feet, that holds value as a product, such as an standard shipping container used to transport goods, or a building module 704, may be created or modified within the production process as identified as a non-limiting example, 905, in FIG. 9, following the production process as illustrated in FIG. 8 or FIG. 10, for example, an in-production building module 905, may located at Station 1 in FIG. 10 where the decentralized CPS system or invention is completing cutting or grinding tasks using a fully-automated or semi-automated robotic arm, as the workforce 1 or 4 to complete the production process or a manual production process may be used where the workforce 1 or 4 completes the process as defined in a unique standardized work order (STANWO) 123, by using an electric hand tool and then report back to the CPS and update the STANWO 123 and Electronic Building Master (EBM) 6 identifying the workforce 1 or 4, by way of the decentralized CPS Node 2 or 5, has completed the production task, which may, or may not automatically, semi-automatically or manually initiate a follow-on STANWO 123 for a third-party inspector 7, or supervising workforce 1 or 4 to verify or certify the completion or quality of the task completed. A building module may also be in its finished state and assembled to create a finished structure 705, or a decentralized artificially intelligent immediate response factory 901, for example, which transacts decentralized external data using a decentralized CPS Node 2 or 5, and adjusts the product definitions, specifications or quantities in a decentralized artificially intelligent Master Knowledge Generator 10, using blockchain protocols to create or modify a single or group of STANWO 7 associated with the manufacturing of materials, components or equipment 128, or off-site manufacturing and product development 129, stages in the Standardized Delivery of Housing Method or invention, as illustrated in FIG. 1E, or a finished building module may have completed the pre-approval process required and sits in inventory waiting to be shipped 130, shrink wrapped, as part of the production process identified as a non-limiting illustration in FIG. 10, waiting to be assembled, as identified in FIG. 8 or FIG. 10, to a customer 112, or decentralized site 903, as illustrated in a non-limiting example in FIG. 9. where the building module may have completed an inspection process by the third-party inspector 7, verifying the accuracy and completeness of the finished building module 903. and identifying it compliant to the standards set forth in the Public-Private-Partnership Master Contract 111, or by a regulatory agency 113, Bank 120, customer 112 or other interested party identified, or not identified in FIG. 1C. In any situation where the building module, 704, 905, 903, 902, 901 or 705, the building module can be individually tracked by a decentralized CPS Node 2 or 5, have an pre-assigned value, based on a fixed amount in the Master Contract 111, STANWO 7, or based on the invention created economic market, and the building module 704, 905, 903, 902, 901 or 705, or its value can easily transfer, increase, or decrease, between different decentralized artificially intelligent resources within the system, or outside the system, such as selling or leasing the building module with a pre-determined value, as defined in the Master Contract 111, or a public sale or lease, wherein the invention creates a market economy, where two economic forces are created within the greater world, national, state, municipal or consumer economy, consider the building module 704, or final structure 705, as a product or commodity available, known as supply and demand, direct the production of the Standardized Delivery of Housing Method (STANDHOME or method invention) or decentralized artificially intelligent Cyber-physical System (CPS or system invention), so that a building module 704 or a finished structure 705, rely on the economic market interplay, or interaction between a potential seller of the building module 704 or a finished structure 705, and the buyers for that building module 704 or a finished structure 705, commonly known as supply and demand theory, to function, where demand is defined by the amount of value of the building module 704, or final structure 705, and where supply is defined by the building module 704, or final structure 705, is available for purchase or lease, and if the supply of building module 704, or final structure 705, is low while the demand is high, it may increase the price of the sale or the lease, that the decentralized artificially intelligent cyber-physical system (CPS or system invention) will charge for it, or conversely, if there is a greater supply of a certain building module 704, or final structure 705, and the created market economy does not want a building module 704, or final structure 705, the price of the building module 704, or final structure 705, may go down. A non-limiting example of this market economy created by the invention is when there is a shortage of supply of building module 704, or final structure 705, in the City of Los Angeles, Orange County, California, San Francisco, Florida, New York City, Miami or any other national or international jurisdiction (collectively, the Market), and the Market has a demand for building module 704, or final structure 705, to solve their affordable housing crisis, homelessness crisis, natural disaster crisis, pandemic crisis, is interested in a certain structure characteristic, such as being carbon zero, incredibly strong and safe, for example the need to survive natural or manmade disaster, or just likes the design style and aesthetics of the building module 704, or final structure 705, and is motivated to purchase or lease a building module 704, or final structure 705, to meet, deliver, satiate or exceed their need, the price or lease of the building module 704, or final structure 705, created by the STANDHOME method or CPS system, or invention may goes up, or alternatively, if the Market, such as the City of Los Angeles has no need or demand for safe affordable building module 704, or final structure 705, the price of the building module 704, or final structure 705, may go down. In either case, the decentralized artificially intelligent cyber-physical system will capture and predict the levels, both current and potential of supply and demand of the building module 704, or final structure 705, and will tend to move toward an equal balance, however this equality, if achieved, will likely not be held for long, so the tension between supply and demand creates a fluctuating market and the invention continues its deep learning analysis to predict and acquire the best efficiency for the invention's decentralized system and method, or for the created market economy for building module 704, or final structure 705, The decentralized artificial intelligent cyber-physical system (CPS or invention) standardizes the production of housing thereby creating value in the modules as products. The transparency, created by the reporting and data sharing, as well as the inherent traceability of the Standardized Delivery of Housing Method (STANDHOME or invention), facilitates the financing of building modules as collateral and product, such as utilizing unique identification numbers for each building module 704. An example of this is how the invention can turn the decentralized manufacturer of building modules 704, into a Bank 120, that can finance the purchase of the standardized building modules via a loan or lease term, or third-party participants, such as third-party banks, non-profits or individuals; federal, state or municipal agencies could also use building modules 704, as an insurance company or a Bank 120, in the very same way as the standardized building module manufacturer, for a non-limiting example, the federal Housing of Urban Development (HUD) could finance the building modules 704, for a city, such as Los Angeles, or a state such as California, or the decentralized manufacturer of building modules 704, that owns the inventory of building modules 704, could offer subsidies, or price reductions for example based on variables such as credit worthiness or monetary value of a purchase order, for example from FEMA, or a state, such as Florida, or a city such as Miami.

Figure 3:
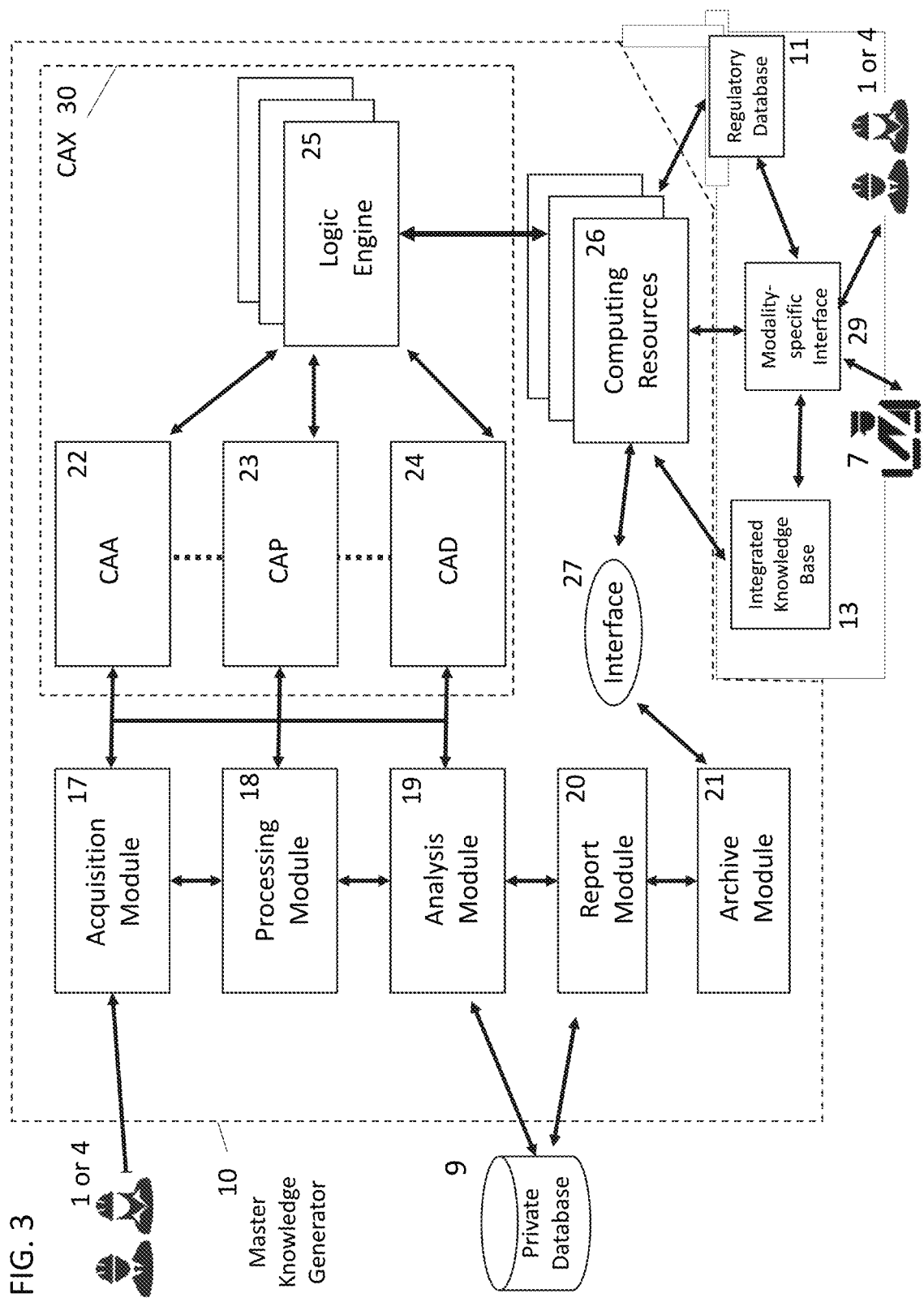
FIG. 3 is a schematic diagram illustrating a decentralized artificial intelligent cyber-physical process which include means for acquiring, modifying, predicting, creating and assigning real estate and mechanical assembly data through automated, semi-automated, or manual techniques of machine learning.

In terms of predictability, the decentralized artificially intelligent cyber-physical system (CPS or invention) can make certain predictions using decentralized Master Knowledge Generator 10 as illustrated in FIG. 3 based on certain socioeconomic data, such as the size of the population in Los Angeles, or similarly as an example, the number of building modules 704, or finished structures 705, or standardized production factories 901, for example can be predicted, defined, designed, and generated or ordered, based on census data, geospatial data collected from a decentralized artificially intelligent drone-enables CPS Node 2 or 5, with LiDAR capability to define the housing, schools or emergency preparedness need, for the purposes of for example, how many numbers of homes destroyed in a natural disaster in years past need to be replaced or have been demolished from a natural disaster, or if the fully automated drone-enabled CPS Node 2 or 5, an accredited organization such as The Salvation Army or the Red Cross, two of the largest and most experienced organizations trained in community natural disaster response may use a decentralized CPS Node 2 or 5 to manually, or semi-automatically enter the data using a Web 3.0 application of how many structures, such as homes, schools, hospitals, commercial centers or other habitable structures were destroyed in a natural disaster, so that decentralized artificially intelligent Master Knowledge Generator 10, can determine the amount of structures needed, how much each structure, or the entire delivery of housing may cost and over what time period it will take to deliver, using the Standardized Delivery of Housing Method (STANDHOME), and inform interested parties, such as government agencies like FEMA, for example, so that they can provide the financial resources to produce building modules 704, or finished structures 705, or standardized production factories 901, or the territory of Puerto Rico, or the United States President's office, so that the President can review a transparent, independently verified cost and time estimate to delivery structures the jurisdictions in need, using the invention.

The invention, by way of turning its verifiable building modules 704, into a valuable product throughout the entirety of the Standardized Delivery of Housing Method (STANDHOME or method invention) provides the manufacturer of the building modules 704, the ability to collateralize loans that are business loans, by virtue of the assigned value of the building modules 704 or finished structures 705 or 901, for example the decentralized manufacturer of the building modules 704, using the CPS system and the Standardized Delivery of Housing Method, both the invention, may finance direct purchased by customers 112, whether individuals, private entities, non-profits or federal, state or municipal governments, due to the value of the building modules 704. The decentralized manufacturer of the building modules 107, as part of the CPS system using the Standardized Delivery of Housing Method may also set insurance pricing or offer insurance just like an automobile manufacturer, such as Ford Motor Company, the invention in this non-limiting example would eliminate an insurance company as a middleman, if the customer 112, were to receive a mortgage, due to the invention providing the decentralized manufacturer of the building modules knowing and being able to predict the cost of the building module, and the value of the building model 704.

Figure 1C:
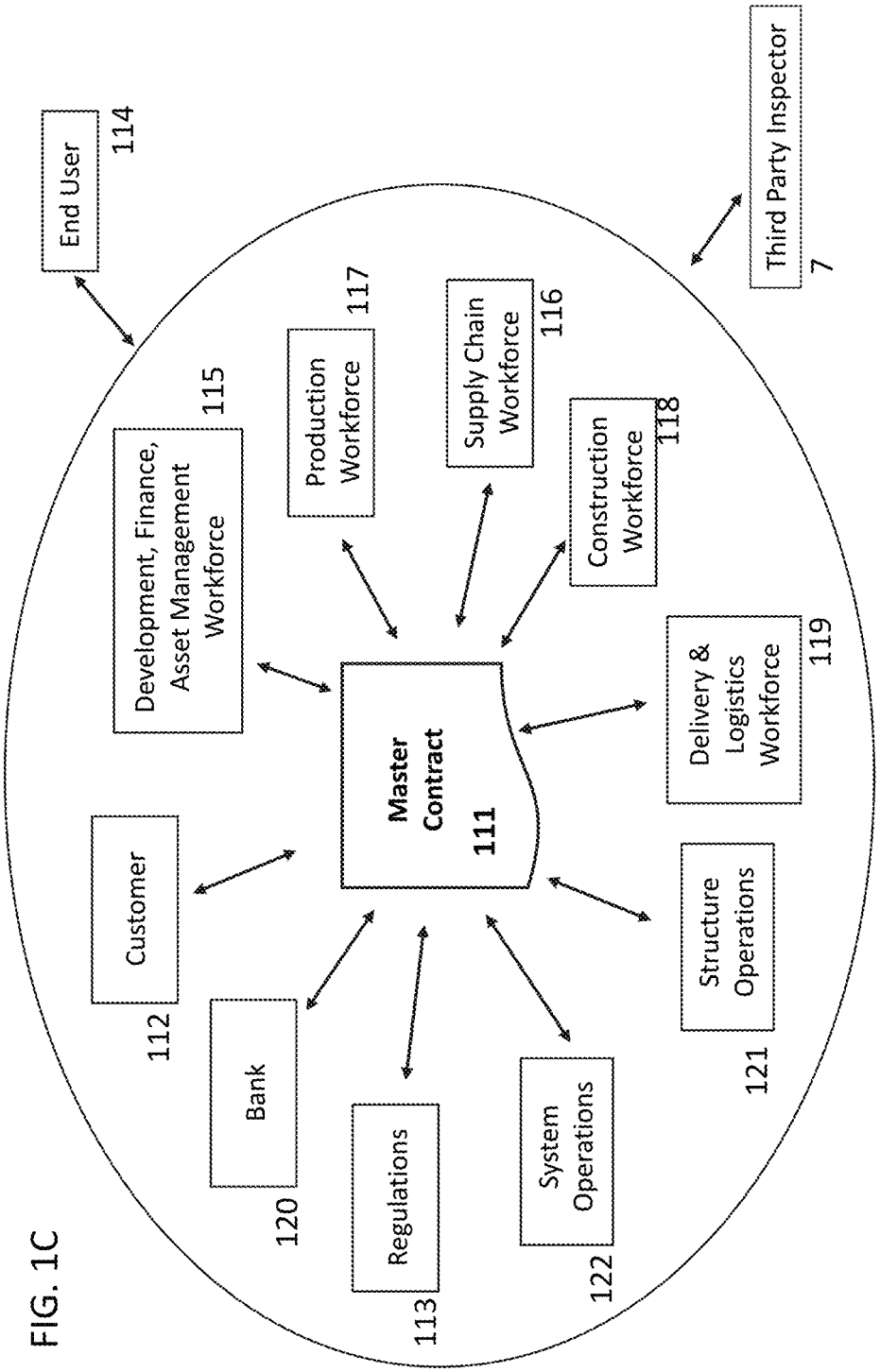
FIG. 1C. is a schematic diagram illustrating a public-private-partnership through a master contract between two or more parties that agree to use the invention to solve a housing crisis in exchange for something else of value to a party or group of parties within the master contract, and is used to identify, document, legally bind and enforce each party, which in turn, authorizes the automatic pre-approval of further functions and transactions within the invention, or may require third party verification for certain tasks in order to proceed with other decentralized processes created, defined and executed within the invention.
Figure 1D:
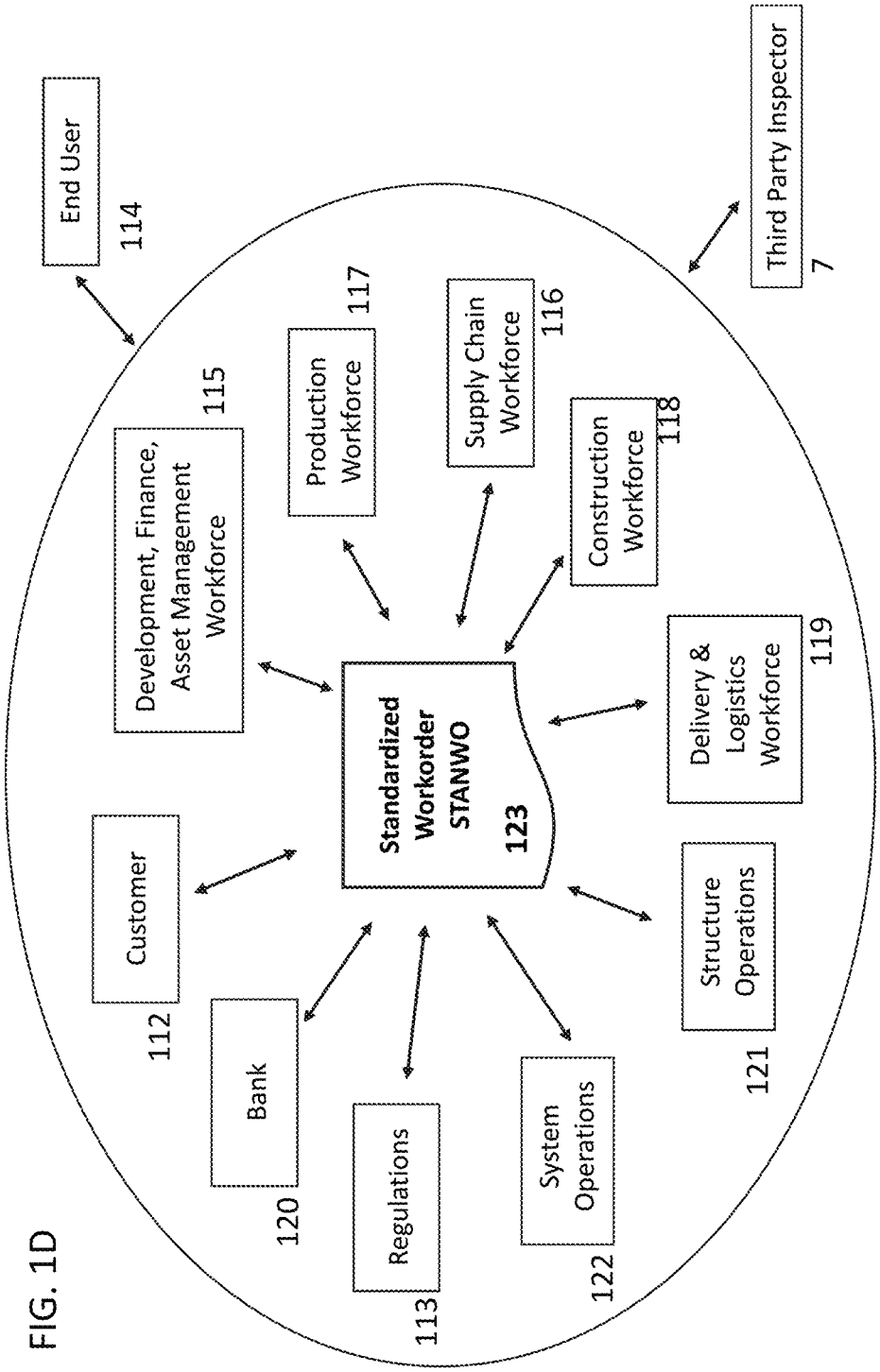
FIG. 1D. is a schematic diagram illustrating a standardized work order which authorizes the invention to create, update, modify or assign a task or process to complete, or a method or resource to use or follow, or details what specifications, safety and security measures to follow, as well as defines if the transaction is to be automatically executed, or if it requires authorization from another resource to proceed.
Figure 1E:
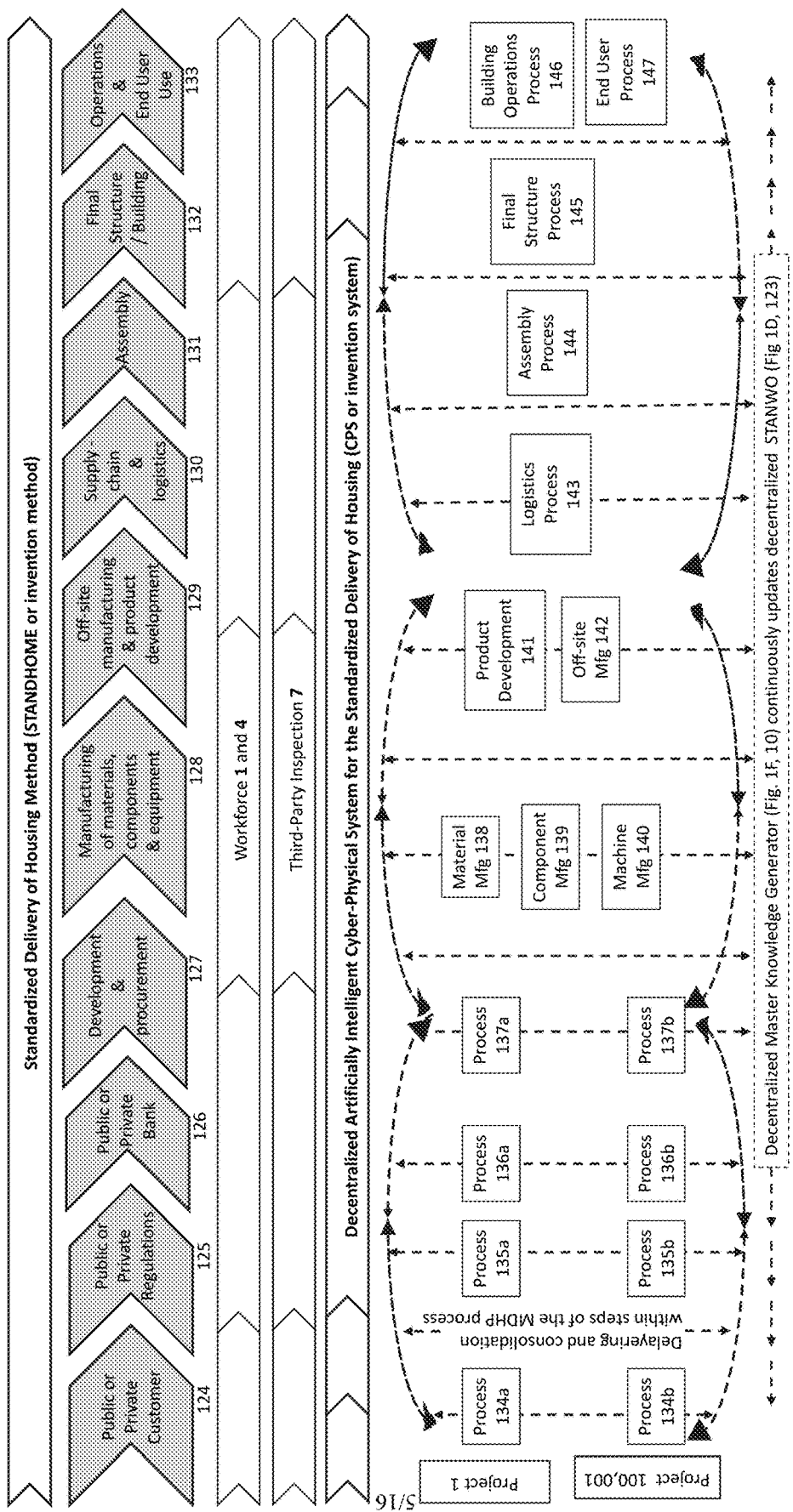
FIG. 1E. is a schematic diagram illustrating the various elements of the standardized delivery of housing method the system follows to solve a housing crisis including the stages, resources, and the processes and protocols it follows to solve a housing crisis.

Another non-limiting example of how the invention turns the process of building a finished structure into a standardized, independently trackable product for the purposes of financing, regulating, selling or leasing, but it can only be done by using the invention is how the invention creates a market economy process, defined by the buying and selling of the building module 704, or final structure 705, in its raw- or final state by offering them up for bids, taking bids, and then selling or leasing the item to the highest bidder, or buying the building module 704, or final structure 705, from the lowest bidder in exchange for another value, may be defined in Master Contract 111, or STANWO 123 as illustrated in FIG. 1C and FIG. 1D, and may be applicable to a single party within the Master Contract 111, such as an insurance company or a Bank 120, lending or pledging its capital to the Customer 112, or other parties within the Master Contract 111, for the purposes of leasing the building module 704, or finished structure 705, to another interested party, or Customer 112, assigning value, to the building module 704, or final structure 705, for the purpose of, for example, determining what the total estimated, predicted, or actual cost of a building module 704, or final structure 705, may be, or for example, an accounting person using the Standardized Delivery of Housing Method (STANDHOME or method invention) or decentralized artificially intelligent cyber-physical system (CPS or system invention) assigns a value, using a decentralized artificially intelligent node 2 or 5, to identify the building module 704, in its raw- or finished-state within the decentralized network, such a warehouse in Long Beach, California, for the purposes of identifying or predicting the amount of monetary value in inventory, of the building module 704.

FIG. 1C. is a schematic diagram illustrating a master contract between two or more parties that agree to use the invention to solve a housing crisis in exchange for something else of value to a party or group of parties within the master contract, such as, but limited to goods, cash, services, or a pledge to exchange items defined in the Master Contract 111, and is used to identify, document, legally bind and enforce each party which in turn, authorizes the automatic pre-approval of further functions and transactions within the invention, or may require third party verification for certain tasks in order to proceed with other decentralized processes created, defined and executed within the invention. A non-limiting example of this is method is how the City of Los Angeles acting as a customer 112 shown in FIG. 1C, uses the invention to devise a housing plan to deliver twenty-five thousand homes to its jurisdiction 101 and the City, by way of using the invention needs to identify what the potential options and configurations are available to the Invention based on the invention predicting the feasibility and probability to assemble standardized building module 704s for each identified land parcel for final standardized structures/buildings 705, based on the criteria set by public or private regulation groups 113 or 125, such as the California Housing and Community Development agency (HCD) or the California Division of the State Architect (DSA) or a private non-profit organization such as The Salvation Army, insurance, or public or private Banks 120 or 126, such as Wells Fargo Affordable Housing Community Development Corporation, or any Community Development Entities (CDEs), private equity or debt fund, Real Estate Investment Trust (REIT), or any other similar group identified in FIG. 1C and FIG. 1E. where their interest in the invention's decentralized processes for business financing may or may not be in the form of Initial Coin Offerings (ICOs) that are used for the incorporation, voting, payments or talent or project coordination of enabling the invention to scale or complete the Standardized Delivery of Housing Method (STANDHOME or invention method), as well as identify and detail what the ranges or specific times, costs, and workforce that may be required so that the Invention can organize and allocate its resources 102, such as, any non-limiting federal, state, municipal, real property/land parcels, subsidies, agencies, or similar resources that can be utilized by the invention to solve the City's housing crisis and complete the Master Contract 111 for the interested parties.

Figure 1F:
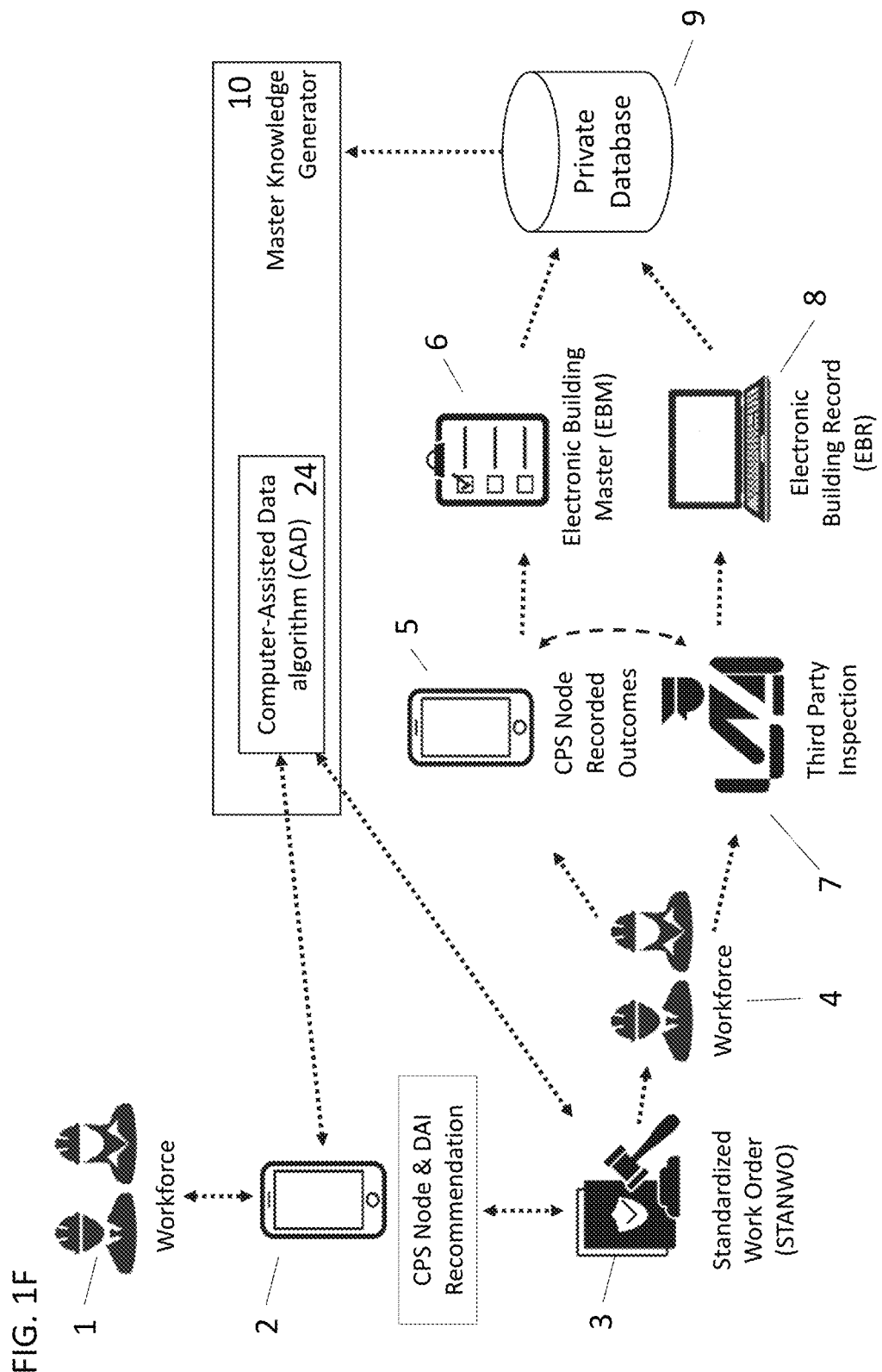
FIG. 1F. is a schematic diagram illustrating a decentralized artificially intelligent cyber-physical system (CPS) that interfaces with decentralized resources as part of the workforce, data capture and computer processing nodes, standardized work orders, third party verification, public and private databases, and decentralized artificial intelligence learning in accordance with an embodiment of the present invention.

Furthering this same non-limiting example, the invention, or the parties of the Master Contract 111, create an Administration 104, made up of for example, humans or decentralized artificially intelligent CPS Nodes 2 or 5 that operate from within the invention, or from outside the invention, in accordance with the Master Contract 111 and STANWOs 3 across and among, government agencies, such as any federal, state, municipal agency willing and able to provide any resources to support the elements illustrated in FIG. 1E or described here within, or any financial, private, for-profit, or non-profit entities, such as banks, investment firms, management firms and other similar institutions such as Bank of America, or BlackRock, an asset management company with an interest in utilizing Web 3.0 applications such as Blockchain, The Salvation Army, and any other private entity specializing in domestic and international real estate industry or any of the entities supporting the invention in terms of service, materials or assets such as, Prologis, a logistics real estate and supply chain logistics company that supports the interest of the invention to operate more efficiently across multiple decentralized CPS Nodes 2 or 5 and a Systems Operations group 112, that includes a technology resources and management to monitor and administrate the invention's information technology systems including decentralized artificially intelligent cyber-physical systems made up of hardware, software or Web 3.0 applications such as Blockchain as illustrated for example, in FIG. A, FIG. 1E, FIG. 1F and FIG. 3 to meet the objectives set forth in the Master Contract 111, and meets the needs of any individual or collective parties associated with the Master Contract to be able to read anything, but no single user has control over who can write what, allowing for the disintermediation of third-party trusted resources in networks to increase their level of transparency and efficiency by using broad cryptographic, distributed, consensus-driven technologies that are configured specifically to meet the needs of the CPS regarding throughput, privacy, immutability regarding throughput, privacy, immutability, speed, and decentralization, and depending on the configuration, an example of the invention may include blockchains that are called distributed ledgers, mutually distributed ledgers that are part of the Web 3.0 stack in much the same way individuals and organizations use SMTP protocol when sending email or using SSL when doing online banking today.

Figure 2:
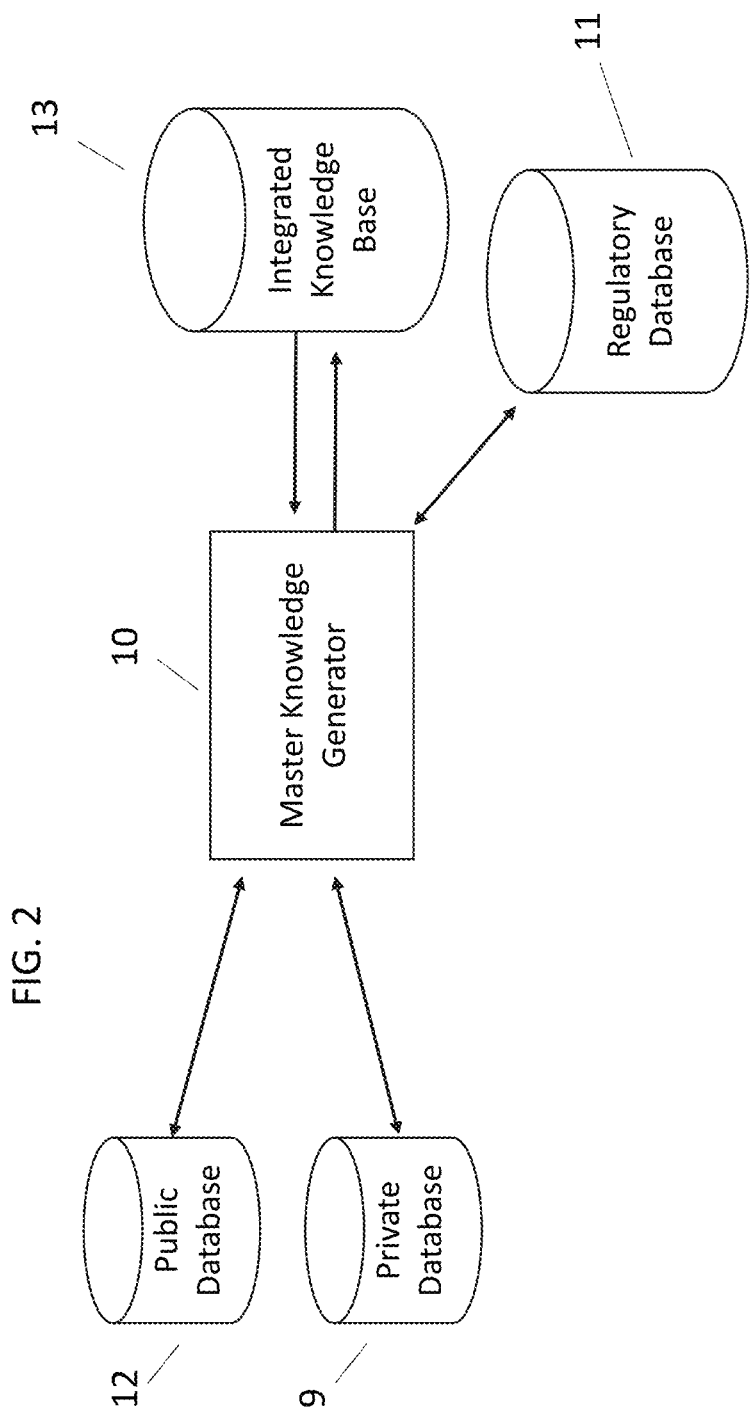
FIG. 2. is a schematic diagram illustrating how various data resources interface with other public and private databases creating an Integrated Knowledge Base used by workforces and third-party inspections in accordance with an embodiment of the present invention.

The invention, using its decentralized artificially intelligent cyber-physical system with Web 3.0 applications and Blockchain has a profound impact across the Standardized Delivery of Housing Method (STANDHOME) using decentralized computer code with imbedded 'blocks' of information that runs in concert with the decentralized artificially intelligent transactions, that the Master Knowledge Generator 10, along with the various public and private databases as illustrated in FIG. 2, among other decentralized network resources crate a highly secure and instantly informed general ledger that allows CPS Nodes 2 or 5, in any transaction on the inventions Blockchain to verify or audit those transactions transparently, efficiently, and accurately, which reduces the risk, costs or exposure in any type of transaction, transmitted or stored across the decentralized network. A non-limiting example of this is with the invention's created market economy for building modules 704, where the invention, through the use of its Blockchain functionality provides insurance companies or Banks 120, for example the ability to verify specific property details of the building module 704 by historically cross-referencing the transactions in the Electronic Building Master (EBM) 6, or independently verified Electronic Building Record (EBR)

8, or the floor plans detailed in the Product Development process 141, with the building module's 704 digital identity or 'hash', the invention provides insurance companies or Banks 120 in this non-limiting example the ability to qualify borrowers using the invention, based on their digital credentials in processing-seconds, versus days or even weeks if not utilizing the invention. The invention's Blockchain function also stores sensitive data like credit scores, social security numbers, or transaction records in a secure digital form which obfuscates specific data within the unique EBM 6 or EBR 8, only sharing what is relevant to the requesting decentralized CPS Node 2 or 5, for example a decentralized workforce 1 or 4, or any decentralized party using the CPS system for the purposes of producing building modules 704 or completing Structure Operations Processes 146, may not be able to see, or even be aware of data such as a customer's 112 financial terms within a Master Contract 111, or be able to identify a human member of the invention's decentralized workforce 1 or 4 home address information or employment terms which is also stored within system's private database 9 or integrated knowledge base 13.

Figure 1G:
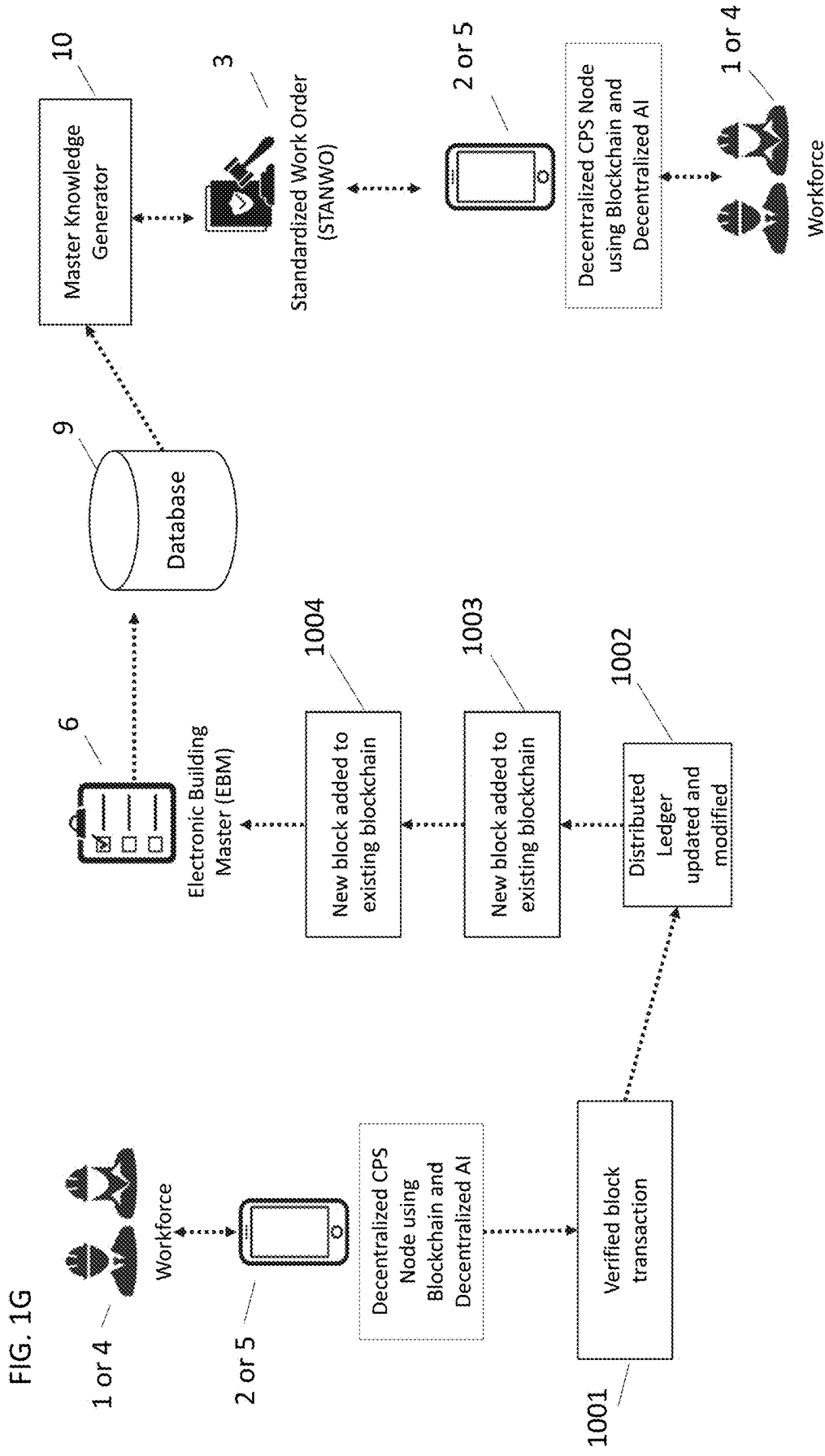
FIG. 1G. is a schematic diagram illustrating a decentralized artificially intelligent cyber-physical system with Web 3.0 applications and Blockchain.

The invention, using its decentralized artificially intelligent cyber-physical system with Web 3.0 applications and Blockchain, using a digitized leger of all transactions, combined with the invention's decentralized artificial capability to apply deep learning as illustrated in FIG. 1G, to predict, configure and deliver standardized building modules 703 and finished structures 705 or 901 using data transacted with external resources such as public or private databases 12 or 9 for property or title searches, financing, leasing, purchasing and selling, due diligence, managing cash flows, payment management, including cross-border transactions to organizations in other counties, provides the invention the ability to fully automate, semi-automate or manually complete or transact applications relating to securities or land deeds for example, enabling the workforce 1 or 4 associated with the Development and Procurement stages, where the attention and details of the Standardized Delivery of Housing Method (STANDHOME or method invention) utilizing decentralized artificially intelligent protocols within the CPS system, or system invention, such as Process 137 as illustrated in FIG. 1E, which is configured to complete artificially intelligent, fully automated, semi-automated or manual financing-related blockchain transactions, for the purposes of procuring land parcels from a resource, such a private entity or public entity, while simultaneously for example, Process 137 can inquire and execute vendor or decentralized workforce 1 or 4 related transactions that are being evaluated for inclusion as well, making the invention compliant with state and federal securities regulations.

The invention as illustrated in schematic diagram FIG. 1E, FIG. 1F, FIG. 2 and FIG. 3 is a non-limiting example of how the invention uses decentralized artificially intelligent computer-assisted data algorithms (CAD) 24, to predict and solve a housing crisis by using pre-defined sequences in the decentralized Master Knowledge Generator 10 that creates, defines or modifies the current, historical or optimal stages, resources, or functions the decentralized artificially intelligent cyber-physical system (CPS) to execute for the Standardized Delivery of Housing Method (STANDHOME or invention method) as illustrated in FIG. 1E which the CPS uses as its continually updated and decentralized method to create, update, predict and transact the decentralized CPS functions within the inventions decentralized artificially intelligent CPS Nodes 2 or 5, such as delivering twenty-five thousand finished standardized structures/buildings 705 such as one hundred permanent supportive housing structures for seniors, two hundred and fifty classrooms to public schools within the jurisdiction, eighteen indoor farming facilities, two smart factories and three hundred mixed-income affordable housing apartments that need to be located within certain prioritized areas 101, such as standardized city blocks that make up an Opportunity Zone, revitalization zone or New Market Tax Credit zone, or any other segment that can be measured by geospatial resources within the invention 137 or the need to manage the collective resources, time, workforce, or cost within the decentralized Master Knowledge Generator 10 required to complete the Master Contract 111 in its entirety, or a sub-section, or a group, or individual, or resource that is identified within the decentralized and unique Electronic Building Master file (EBM) 6, such as certain building materials or building components such as steel beams, kitchen or bathroom modular inserts, electrical wiring, CPS Node-enabled fully automatic, semi-automatic and manual fork lifts, trucks, cranes, drones, airplanes, ships or other heavy machinery or useful vehicles, including their operating instructions, licensed and authorized workforce operators and so forth, while the independent and third-party monitored unique Electronic Building Record file (EBR) 8, as illustrated in FIG. 1F, which is further described herein, contains for example, relevant logs of STANWO 3, detailing and providing evidence data for verifying the authenticity and compliance of building component, building module 704 or finished structure 705, certifying, for a non-limiting example the approval of certain third-party non-destructive testing methods, such as X-Ray, dye penetrant (DT) or visual (VT) as well as storing the digital images and data for performing compliance with Regulations agencies 113, such as the United States Housing and Urban Development Authority (HUD) or California's Housing and Community Development Agency (HCD) among others, or the invention may assign a decentralized resource through a fully-automated, semi-automated, or manual process, such as how the invention may scan available land within the pre-defined jurisdiction using a decentralized artificially intelligent CPS Node 2 or 5, such as aerial drone as illustrated in FIG. 1F that for a unlimiting example, uses LiDAR and may be configured with decentralized sub-centimetric Global Navigation Satellite System (GNSS) receivers, that eliminate the task of placing and measuring ground control points (GCP) with heavy and costly topography equipment and uses Post-Processed Kinematics (PPK) for georeferencing images with precise camera positions recorded at the times of triggering that can ensure a high degree of accuracy and completeness of capturing the data that is requested to be sent to the system for machine learning and deep learning analysis in the decentralized Master Knowledge Generator 10 as illustrated and explained in FIG. 3 herein, or if that CPS resource is not available or additional resources are needed by the invention, the Administration 104 or a Systems Operations group 112, ensures a database, or a series of databases, such as the ones identified in FIG. 2 may acquire and analyze digital images and measurements of the land parcels using digital surface models (DSM), digital terrain models (DTM), digital elevation models (DEM), point clouds, contour lines, or orthomosaic images created from a series of images, where the geometric distortion has been corrected and the imagery has been color balanced to produce a seamless mosaic dataset of land parcels in the City which allows the invention to analyze, eliminate or identify potential feasible land parcels in the City that may be considered for the invention, to assemble 131 the final standardized structure 705, by analyzing and configuring various standardized building module 704s that fit the criteria and are within the parameters set by public and private regulation groups 125, such as property line restrictions, property set back requirements, elevation changes, known utility sources nearby, and the invention may take into consideration other interests defined by the parties in the Master Contract 111 as shown in FIG. 1B, or rank other known or unknown variables to determine the level of importance in achieve the Master Contract 111 objectives such as identifying and analyzing the distance from the identified and potential land parcels that are deemed feasible to deliver and assemble a standardized structure 705, that meet the highest and best use criteria to develop the land parcel, based on a probability score the invention generates through its decentralized cyber-physical system, such as identifying, analyzing or predicting the shortest time to complete the entire Standardized Delivery of Housing Method (STANDHOME or invention method) as illustrated in FIG. 1E, or to maximize the density and height of building modules in the final standardized structure 705, that are deemed feasible based on a pre-defined threshold, or can acquire the most amount of standardized and available subsidies or tax credits within a pre-set range, for that identified real or potential finished structure 705 so that it contributes to a pre-defined minimum standard for achieving the City's or invention's goal as pre-defined in the Master Contract 111 due to the finished structure 705 being within an allowable pre-set distance from a school, hospital or low-income community specified by one or all of the parties to the Master Contract 111 which are most interested in community recovery or growth 106, and in furtherance of this example, due to one or more of the criteria being authenticated in the invention for the delivery of housing within the Master Contract 111, one party may reward another party within the Master Contract 111 such as Community Development Financial Institution (Bank) 120 releasing funds by means of an automated decentralized STANWOs 123 to a Development, Finance, Asset Management Workforce 115 illustrated in FIG. 1D to acquire or transact on a number of parcels of land in the City due to the invention identifying, validating and verifying the land as being feasible to assemble 131 the standardized structures 705 or 901, by means of completing the necessary steps as outlined in the STANWOs 123 or 3 or by verifying the outcomes in the Electronic Building Master (EBM) 6, used by the Workforce 1 or 4, or by a Third Party Inspection 7 such as a City engineer that is certified in civil engineering, structural engineering or a similar specialization as illustrated in FIG. 1F. that records their verification of measurements in the Electronic Building Record (EBR) 8, that initiates the releasing of funds from the Bank to the to a Development, Finance, Asset Management Workforce 115.

The invention as illustrated in schematic diagram FIG. 1E, FIG. 1F, FIG. 2 and FIG. 3 is a non-limiting example of how the invention defines the decentralized artificially intelligent cyber-physical system resources, including the various Workforce 1 or 4, or illustrated in FIG. 1D, such as the Development, Finance, Asset Management Workforce 113, who carry out functions defined in unique and decentralized STANWO 3 such as, purchasing a real asset/land parcel, determining the feasibility or value of the specified, proposed or potential land parcel within a defined jurisdiction, or create, modify or authorize a decentralized STANWO 3 for the purposes of modeling the strategic interaction between two or more STANWO 3 in a situation that contains a set of rules and outcomes defined by the invention, such as how many standardized final structures 705 can fit within a defined jurisdiction 101, or for the purposes of delivering the highest and best design or configuration scenario using standardized, or not standardized building module 704s by transacting STANWO 3 using the decentralized artificially intelligent Product Development process 141 and simultaneously, or in conjunction with, or separately using the invention and the decentralized Master Knowledge Generator 10 to investigate, prioritize, predict and solve for obtaining the necessary approvals from the Regulations authorities 113, or for the relevant Banking organizations 120, or customers 112, or any other party illustrated in FIG. 1D.

The invention as illustrated in schematic diagram FIG. 1E, FIG. 1F, FIG. 2 and FIG. 3 is a non-limiting example of how the invention uses the decentralized artificially intelligent cyber-physical system resources, including the various Workforce 1 or 4, or illustrated in FIG. 1D, such as the invention's use of its decentralized artificially intelligent Computer-Assisted Data algorithm (CAD) 24 which uses machine learning and deep learning to consolidate, optimize, predict and create or modify functions within the CPS for the purposes of executing the Standardized Delivery of Housing Method (STANDHOME or invention method), for a non-limiting example of the multiple manufacturing processes, such as material manufacturing 138, component manufacturing 139, machine manufacturing 140, and off-site manufacturing in a standardized, decentralized production facility or smart factory 901, as shown in FIG. 9 using a cyber-physical CPS Node 2 or 5 with decentralized artificially intelligence CAD programs 24 to consolidate vertical and horizontal STANWO 3 protocols to increase the degree of internationalization which involves mechanical and deep learning computer processing to make building materials, building components, building module 704s and finished structures 705 as efficient and adaptable as possible, so that they can easily be applied to different and unique national or international population-wide housing crises, or the invention executes Development and procurement functions 127, so that the decentralized artificially intelligent cyber-physical system can apply statistical game theory and create or modify STANWO 3 for the purposes of selecting designs of building module 704s or finished structures 705, or specific building components from a continually updated Master Knowledge Generator 10 that defines digital and physical real world examples of standardized building components, building modules 704s or finished structures 705 or 901, or the invention as part of the same procurement sequence 127 initiates a STANWO 3 to bid, negotiate, procure or return a building component or material with a standardized supply chain workforce 116 or 130 so that the invention can track, measure or predict the probability or actual transaction of the STANWO 3 making the fully-automated, semi-automated or manual transaction or potential transaction transparent, such as the details of price, sustainability, and timing to the parties illustrated in FIG. 1D and that the decentralized artificially intelligent protocols defined in the STANWO 3 are efficient and easy to follow, additionally the CAD algorithms 24 enable the CPS Node 2 or 5 to transact or deliver materials, building components, or building module 704s just in time to other appropriate or related decentralized artificially intelligent CPS Node 2 to assemble, or coordinate the completion of a finished structure 705 or Building Operations and End User protocols 133.

The invention as illustrated in schematic diagram FIG. 1E, FIG. 1F, FIG. 2 and FIG. 3 is a non-limiting example of how the invention uses the decentralized artificially intelligent cyber-physical system resources, including the various Workforce 1 or 4, or illustrated in FIG. 1D, such as the invention's use of its decentralized artificially intelligent Computer-Assisted Data algorithm (CAD) 24 which uses machine learning and deep learning to consolidate, optimize, predict and create or modify functions within the CPS for the purposes of executing Standardized Delivery of Housing Method (STANDHOME or invention method), for a non-limiting example of the CPS protocols, such as determining the total cost of ownership of a standardized and finished structure 705 or 901, standardized building module 704, building component or element within the invention including Internet of Things (IoT) hardware and software used for smart finished structures 705 or 901, including smart factories, smart housing and other smart habitable structures, or building module 704s, building components or resources used to optimize energy consumption, efficiency or to measure the sustainability of a a particular part, process or completed result with the Standardized Delivery of Housing Method (STANDHOME or invention method), including autonomous machinery with decentralized CPS Nodes 2 or 5 within production or transportation areas to optimize efficiency for functions such as delivering building material, building module 704s or assembling structures, or using deep learning analytics through CPS Node 2 with End Users for the purposes of generating after completion data such as transacting a STANWO 3 for initiating a protocol or for acquiring data on the final structure 705 or 901, or usage patterns, or socioeconomic, demographic or behavioral input from the user or building operator, which will be used to modify or create various STANWO 3 to populate decentralized machine or deep learning information in the Integrated Knowledge Base 13 from decentralized CPS Nodes 2 or 5 or from the EBM 6 or EBR 8 that will applied to current, future or predicted procedures by the Workforce 1 or 4 to make them more productive, efficient or less costly, or by Third Party Inspectors 7, or by interested parties associated with the Master Contract 111, such as modifying the decentralized product development 141, off-site manufacturing, logistics 143, assembly process 144, or final structure process 145 to become more lean in requiring resources on the project site for assembly, smart facility for production, or with the decentralized service providers such as freight forwarding companies 130 or other certain CPS segments.

A standardized work order STANWO 123, as illustrated in FIG. 1D authorizes the invention to create, update, modify or assign a task or process in accordance to the Master Contract 111, to complete, define or predict, a method or resource to use, or to detail the specifications, safety and security measures to acquire or follow, and defines whether or not the transaction(s) associated with the STANWO 123 is to be automatically, semiautomatically, or manually transacted based on the pre-set condition, or if it requires authorization from another resource within the decentralized CPS to proceed; a non-limiting example of this is process is with determining the distribution system 103 to be used within the invention which identifies, engages with, or predicts which decentralized industrial production factories or vendors to use to acquire building materials, building components or building module 704s such as steel studs, drywall, HVAC systems or standardized sub-structures such as a 320 square foot building module 704 that measures 8' wide by 40' long that is assembled in its completed form to produce a final standardized structure 705.

A non-limiting example of the invention, in accordance with the use of a Master Contract 111 and associated STANWOs 123, is how the invention automatically assigns a cost factor to the Workforce 1 or 4 in order to comply with any public works or safety standards 105 such as any prevailing wage requirements for the workforce, the need to implement an on-the-job training and apprenticeship program for the Workforce 1 or 4 so that the invention creates a pre-defined amount of jobs for its End Users 114 as set forth in the Master Contract 111 or a corresponding STANWO 123, which allows the contracted parties or the invention to report on the mission effectiveness of the Housing Plan 109 as illustrated in FIG. 1A in a non-limiting example, to forecast and predict the details and specifications required to achieve the desired recovery and growth metrics 106, such as using the Standardized Delivery of Housing Method (STANDHOME or invention method), as illustrated in FIG. 1E, in a decentralized artificially intelligent cyber-physical system (CPS) with a Web 3.0 application such as Blockchain or software, to identify land parcels available, or not available to the City or to the invention, to complete, modify, adjust and predict STANWO 123, outcomes generated by a CPS or the invention to forecast, track, negotiate a single or a series of standardized, automated, semi-automated, or manual transactions to reserve, evaluate, procure or obtain the authorization and control of resources to automatically, semi-automatically or manually transact the functions, as illustrated in FIG. 1A, which is the process for completing the elements of the Standardized Delivery of Hosing Process, as illustrated in FIG. 1E from executing a Master Contract which authenticates a Public or Private Customer 124, to executing a series of decentralized computer-assisted data algorithms (CAD) 24 and fully automated, semi-automated and manual tasks throughout the entirety of the STANDHOME process including receiving a certified third-party approval for a final structure/building 705 certificate of occupancy by a Regulations 113 or Bank 120 agency or similar, and completing standardized and modified operations and end user protocols 133, throughout the decentralized CPS system to produce and deliver, through a series of decentralize actions, for example completing five thousand standardized affordable housing structures and schools the City 705, and creating six hundred manufacturing technology, construction and housing jobs in targeted low-income neighborhoods 101 within the first twenty four months as set forth in the legally binding Master Contract 111 illustrated in FIG. 1C. and authenticated by Third Party Inspection 7 illustrated in FIG. 1F.

Describing the elements of the invention in an additional non-limiting example, the invention is tasked as defined in the Master Contract 111 with various parties, as illustrated in FIG. 1C or with corresponding STANWO 123 and decentralized resources within the invention to identify and predict the requirements, protocols and resources that are available, unavailable or need to be reserved, acquired or terminated to complete a series of transactions to create, track, modify or communicate the details of a housing plan as illustrated in FIG. 1A, and the invention needs to complete the full Standardized Delivery of Housing Method (STANDHOME or invention method) illustrated in FIG. 1E, and the invention is authorized to predict using machine learning and deep learning as part of a decentralized artificially intelligent cyber-physical system (CPS) a range of possible or potentially possible outcomes while the CPS follows the pre-defined Standardized Delivery of Housing Method (STANDHOME or invention method) for completing the standardized delivery of housing goals for a pre-defined jurisdiction set by the parties as illustrated in FIG. 1C using a Master Contract 111 and associated STANWO 123. In this non-limiting example, the invention would use the elements illustrated in FIG. 1E and FIG. 3 to process a series of computer-assisted data algorithms (CAD) 24 in the decentralized Master Knowledge Generator 10 for the purposes of modeling the strategic interaction between two or more STANWO 3 in a situation that contains a set of rules and outcomes defined by the invention, such as how many standardized final structures 705 can be assembled 131, or how many building modules within the finished structures will be available for Building Operations or End Users 133 by what date, or in what sequence, or by what standardized size or bedroom type, or how many will be available for seniors or have ADA bathrooms installed 101, or at what cost, or what day each of the individual standardized building module 704, will be delivered by decentralized artificially intelligent CPS Nodes 2 or 5, to assemble the final structure, or to define, predict, or learn the specific STANWO 111 by using decentralized artificially intelligent computer assisted data algorithms (CAD) 24 by an interested party, as illustrated in FIG. 1D to make the process more efficient 107 and 109.

Other considerations in this example include the invention completing a process of transacting a single, or series of computer-assisted data algorithms (CAD) 24 in the decentralized Master Knowledge Generator 10 for the purposes of deep learning analysis and to model the strategic interaction between two or more STANWO 3 in a situation that contains a set of rules and outcomes defined by the invention, such as identifying, tracking, predicting or analyzing what the end-user demand for housing is a the City for households such as low-income families or for homeless veterans that are on the streets with no community support, or to evaluate the time schedule, resources or total cost of completing certain STANWO 3 such as completing a final structure 705 to address the needs of critical population 101 and 108, or to use the invention for automatically, semi-automatically or manually initiating a decentralized CPS Node 2 or 5 to acquire or analyze through machine learning or deep learning development and transact a single or series of computer-assisted data algorithms (CAD) 24 in the decentralized Master Knowledge Generator 10 within the CPS Node 2 for the purposes of creating a model that statistically predicts and calculates the strategic interaction between one or more decentralized CPS Node 2 or 5 in a situation that contains a set of rules and outcomes defined by a decentralized STANWO 3, such as identifying, tracking, predicting or analyzing all the elements in the STANDHOME process illustrated in FIG. 1E to complete a final structure/building 705, such as a decentralized standardized production facility, smart factory, indoor farming facility, military building, housing, including mixed-used, mobile homes, single family homes, apartments, commercial buildings, including office buildings, hotels, retail centers, and other habitable structures with decentralized artificially intelligent CPS Node 2 or 5 assembled from the standardized building components or building module 704s as defined by a Master Contract 111 or STANWO 123.

Additional non-limited examples the invention uses the various elements include the decentralized artificially intelligent cyber-physical CPS system and technique for enhancing performance of computer-assisted data operating algorithms and application-specific integrated circuits (ASICs) for Web 3.0 application such as Blockchain where they can be applied everywhere using techniques such as ML-as-a-service (ML-aaS) that utilize open-sourcing in the inventions AI frameworks and datasets illustrated in FIG. 1E, FIG. 2, and FIG. 3 for example where CPS Node 2 or 5 require more and more data and the Web 3.0 application such as Blockchain can provide the single largest repository of open-source validated STANWO 3, EBM 6 or EBR 8 records, and as additional digital assets are stored or traded across, among our outside of the decentralized CPS, including land parcel registries, property records, tickets, or anything physical or digital that is of value to the CPS or parties associated with the Master Contract 111, such as quality assurance training data, robust robotic mechanism data and can be applied to the decentralized Master Knowledge Generator 10 for learning-value-based strategies to complete the Standardized Delivery of Housing Method (STANDHOME or invention method) more efficiently using distributed ledgers, or smart contracts or other decentralization innovations, through decentralized CPS Nodes 2 or 5 such as The Internet of Things (IoT), artificial intelligence, autonomous robotics, 3D printing, where "programmable viscoelastic material" is used to allow the CPS to adjust every part of a 3D printed material to specific levels of elasticity depending on the use, such as creating a building module 704, building component or finished structure 705, or virtual or augmented reality devices, which allows the decentralized data and asset management layer in the invention to link to the other data and value from other decentralized systems, creating a convergence of a Web 3.0, Blockchain-enabled, or token-based enabled, convergence throughout the decentralized resources in the cyber-physical system (CPS).

The invention also uses decentralized artificial intelligent processes illustrated in FIG. 1E, FIG. 1F, and FIG. 3 for an unlimiting example by utilizing Computer-Assisted Data algorithms (CAD) 24, to establish a "global trust" across, among or outside the decentralized CPS system by sharing information on open permissionless blockchains, or token-based platforms, for the purposes of exchanging value and asset ownership. The inventions Web 3.0 applications provide verification, trust and chain-of-ownership for every resource the invention transacts with and can even "share" decentralized, unproductive assets, such as CPS Node-enabled heavy equipment, individual or group Workforce or Third-Party Inspectors illustrated in FIG. 1D, so that under-utilized resources can capture value for another purpose within the CPS or capture value outside the CPS, wherein the decentralized Master Knowledge Generator 10 reduces the need for Blockchain, or token-based, trust brokers in the middle of a market unnecessarily extracting economic rent. The invention also utilizes a Blockchain-based, or token-based data marketplace which solves two major problems in artificial intelligence today, the access to data for those decentralized resources that need it, and monetizing unused data for those decentralized resources that have it, wherein the invention by virtue of connecting Web 3.0 applications such as Blockchain to a decentralized artificially intelligent cyber-physical system for transacting the Standardized Delivery of Housing Method (STANDHOME or invention method), creates an economic mechanism for individuals and organizations within the Master Contract 111 or for decentralized Workforce 1 or 4 to buy and sell authorized data assigned by the Master Knowledge Generator 10 and in accordance with the Master Contract, reducing the incentive to hoard valuable unused data and remunerate the creators of data, not just the processors. The invention in this way provides a method and system for direct data, such as from End Users or other parties within the CPS to be collected or purchased by government or private organizations, such as but not limited to the parties identified in FIG. 1C for the purposes of executing the Standardized Delivery of Housing Method (STANDHOME or invention method).

Additional non-limited examples the invention uses the various elements include the decentralized artificially intelligent cyber-physical CPS system and technique for enhancing performance of computer-assisted data operating algorithms and application-specific integrated circuits (ASICs) for Web 3.0 application such as Blockchain where datasets are compiled and accessed, which may or may not include data from a wide range of resources. Non-limiting examples of such resources include controllable resources, such as real-world data collection methods, imaging systems, electrical systems, mechanical systems, and testing systems mentioned herein. The datasets are analyzed by a human expert or a computer-based expert, such as a decentralized artificial intelligence system that imitates the way humans gain certain types of knowledge, commonly known as deep learning (DAI) and the algorithms are modified based upon feedback from the human expert or computer-based expert. Modifications may be made to a wide range of algorithms and based upon a wide range of data, such as available from an integrated knowledge base or real-world data. For example, modifications may be made in the algorithms providing enhanced functionality. Modifications may also be made on various bases, including Workforce-specific changes, population-specific changes, feature-specific changes, regulatory-specific changes, financial-specific changes and so forth.

FIG. 1F. is a schematic diagram illustrating a decentralized artificially intelligent cyber-physical system (CPS) that interfaces with decentralized resources as part of the workforce, data capture and computer processing nodes, standardized work orders, third party verification, public and private databases, and decentralized artificial intelligence through machine learning in accordance with an embodiment of the present invention. A non-limiting example of this how the invention interfaces with individuals or parties as part of collective contract or contract to complete an agreed upon series of mechanical functions to achieve an agreed upon objective called a Master Contract 111.

The invention is also a method for compiling data and executing human and deep learning sequences in a decentralized cyber-physical computing system (CPS or invention) for the purposes of planning and executing real estate development, regulatory compliance, financial payment, supply chain procurement, industrial manufacturing processes, logistical processes as well as project management tasks, and other various construction, manufacturing and delivery mechanical tasks and procedures to complete the standardized development, production, and delivery of building module 704s and building components in a smart factory 901, that are used to assemble structures, where a Web 3.0 application such as Blockchain, software or hardware using decentralized CPS Nodes 2 and 5 with decentralized computer processing capabilities such that the application or, software or hardware is configured to (i) define a step-by-step repeatable and automated sequence for a pre-set Master Contract 111, such as a population-wide housing delivery plan for a city, and be able to (ii) source, produce, deliver and build structures (such as smart factories, housing, schools, hospitals, emergency shelters, agriculture facilities and military structures) for (iii) private entities, government agencies, such as a municipality, school districts, state or federal governments (customer or customers).

For a non-limiting example, the invention will, in accordance to the initial Master Contract 111, (i) identify real property/land parcel to build structures within a jurisdiction and create a master plan that details the step by step sequence from the present state of the jurisdiction to the defined future state of the jurisdiction which includes (ii) specific details of the real asset/land parcel location, the current, lack thereof, and proposed structure, incorporating the regulatory requirements in-place or needed to build the proposed structure, as well as (iii) the cost, time and resources required (and if those resources are available or unavailable to the invention) to complete the Master Contract 111. The Web 3.0 application such as Blockchain, software or hardware also tracks improvement of all STANWO 3 completions within the invention and compares the information among the databases shared with the invention to develop a maximum effective process recommendation through a newly produced, more optimal STANWO 3, created by the invention to replace other associated STANWOs to make the production tasks or sequences more efficient. For example, the invention will identify a real asset/land parcel for the Mayor of Los Angeles (Customer) in the jurisdiction of the City of Los Angeles that is vacant, and the invention will recommend a structure such as a four story, forty-unit apartment building (Structure) be developed, produced, delivered and assembled for the total cost of ten million dollars, which will take six-months or four thousand three hundred and eighty hours to complete the entire Master Contract 111 and that the CPS has the contract, per the details of the Master Contract 111 to proceed with the authority of the California Housing and Community Development agency (Regulator) along with the authority of the bank of the US Department of Housing and Urban Development (Bank), who is providing funding on behalf of the Customer, to execute the mechanical tasks to develop the real asset/land parcel, purchase the building components, manufacture the building module 704, deliver and assemble the building module 704 to produce the four story, forty-unit apartment building (Structure), as long as the Third Party Inspectors 7 verify the building components, building module 704s and completed Structure is in compliance with the Regulator, Bank and Customer. The process also helps in creating applied learning that can be used to accelerate approval processes with Customers, Regulators and Banks, and can be used in predicting new regulatory building codes, safety measures, jurisdictional guidelines, market cost ranges, product design for structures, delivery procedures and production schedules by providing relevant and applicable data and recommendations in the form the invention defines.

As can be appreciated by those skilled in the art, the invention of the present disclosure includes any of the hardware, Web 3.0 application such as Blockchain, or software, and any other component as may be necessary to implement the invention as described above. Thus, provided below are some example embodiments in which the system and method can be implemented. However, it should be noted that although specific implementations are provided below, the invention is not intended to be limited thereto as any suitable component/hardware/software or Web 3.0 application such as Blockchain, etc. that can be used as understood by those skilled in the art to implement the present invention.

For further understanding, FIG. 1D provides a schematic diagram illustrating a data method and system that interfaces with individuals as part of a workforce, data capture and decentralized computer processing nodes (CPS Node), standardized work orders, verification from third party inspectors, public and private databases, and decentralized artificial intelligence through machine learning in accordance with an embodiment of the present invention. As shown in FIG. 1D, a Workforce 1 is a person or a DAI who is responsible for the financing, approval, production and delivery of structures, sometimes referred to as a "worker". The system is formed to allow the Workforce 1 to input individual data relating to their production requirements 2 into a form or other system that allows for data input. As a non-limiting example, the system also includes Web 3.0 applications downloadable or software that can be opened and operated by a user's computing device 2 (e.g., mobile phone, desktop computer, tablet computer, etc.). Thus, in operation, the Workforce 1 opens the app on their computing device 2 and fills out specific validated measures and questionnaires designed to identify and evaluate the external resource information such as geographical coordinates of a property or sewer line, or the use of a cylindrical robot with CPS Node 2 or 5 functionality that can use kinematic structure analysis to control the velocity of the end-effector of the robot to achieve the purpose of homogeneous painting as defined in the STANWO 3. Once the information is collected and submitted by the Workforce, the computer-assisted data operating algorithms (CAD) module 24 (as further described in FIG. 3) analyzes the data using the decentralized Master Knowledge Generator 10 and indicates to the Workforce (via their computing device 2) and Third-Party Approvals (via their computing device 7), which Standardized work order (STANWO) is recommended, along with the appropriate safety information 3. As understood by those skilled in the art, the CAD module 24 and decentralized Master Knowledge Generator 10 are housed in an abstraction layer of the computing infrastructure that virtualizes and logically presents resources and services to users through application programming interfaces and API-enabled command-line or graphical interfaces.

Once entered into the Master Database Generator, the Workforce becomes part of Cyber-Physical System (CPS) platform (further described herein) where they are sent alerts to execute a data collection or verification protocol in order to increase Workforce and Third-Party compliance. The Workforce 4 is defined as a human or DAI that has either already been entered into the decentralized Master Knowledge Generator 10 and been provided a personalized and authenticated STANWO authorization 3 by means of completing the previously described data capture process (e.g., using a computing device 2), or is a third-party human or DAI that is being monitored and data is being collected by a third party verified source such as an accredited inspector, research team or other related third-party personnel (Third Party Approvals) 7.

The flow of information, as indicated by the arrows in FIG. 1D, may include a wide range of types and vehicles for information exchange, as described more fully below. Interaction between the Workforce 4 may take any suitable form, typically depending upon the nature of the interface. In general, the Workforce 4 may interface with third party approvals 7 through conventional inspection visits, as well as remotely by telephone, electronic mail, forms, specific verifiable data collection or certification and so forth. The Workforce 4 may also interact with elements of decentralized CPS Node recorded outcomes 5 by either routine examinations designed to evaluate changes in specific production conditions, adverse events, quality-changes, physical and emotional functioning, or via a range of data acquisition interfaces, which may include real world data forms, systems for collecting and analyzing real world data, testing metal samples, verifying welds, and so forth. All data captured from decentralized CPS Nodes 2, 5 and third party 7, is encrypted and entered into an third party Electronic Building Record (EBR) 8 or a third-party-compliant Electronic Building Master file (EBM) 6 that is then stored into an third-party-compliant database 9.

As noted generally in FIG. 1D, the decentralized Master Knowledge Generator 10 and interconnection of the various resources, databases, and processing components can vary greatly. For example, FIG. 1D illustrates a private database 9 as being linked to both the decentralized Master Knowledge Generator 10 and the Electronic Building Record 8 and an Electronic Building Master (EBM) 6. Such arrangements will permit the private database, and the Web 3.0 applications and software contained therein, to extract and access information, while providing the information to the decentralized Master Knowledge Generator 10 upon demand. The decentralized Master Knowledge Generator 10, in certain instances, may directly extract or store information in the database where such information can be accessed and interpreted or translated. Similarly, the decentralized Master Knowledge Generator 10 can be linked to the Integrated Knowledge Base 13 (as described in FIG. 2). The decentralized Master Knowledge Generator 10, which may be subdivided into specific interface types or components, may thus be used to access knowledge directly from the Integrated Knowledge Base 13, or to command data be processed in a private database 9 to acquire, analyze, process or otherwise manipulate data. Such links between the data are illustrated diagrammatically in the figures for explanatory purposes. In specific systems, however, the high degree of integration may follow specific Web 3.0 applications and software modules or programs which perform specific analyses or correlations for specific Workforces, specific regulatory jurisdictions, specific institutions, and so forth.

In FIG. 2, a private database 9, such as the database described in FIG. 1D used for collecting third party-compliant Workforce data, or a public database 12 containing other relevant production, external resource or verification information connects to the decentralized Master Knowledge Generator 10. The decentralized Master Knowledge Generator 10 has secure access controls, clear data audit trails and facilitates the management, security, compliance, machine learning and deep learning analysis and reporting processes as illustrated and explained in FIG. 3 herein, relating to data resources, such as private databases 9, public databases 12, the Integrated Knowledge Base 13 and others. In the present context, the Integrated Knowledge Base 13 is considered to include any and all types of available data which can be processed by the decentralized Master Knowledge Generator 10 and made available to the workforce for providing the desired objective. The decentralized Master Knowledge Generator 10 captures and monitors workflows and the resulting generated data in the various data resources.

FIG. 3 is a schematic diagram illustrating a decentralized artificially intelligent computer processing method which include means for acquiring, predicting, modifying and transacting public agency, financial, real estate, mechanical assembly, habitable structure, safety and security data and protocols through automated, semi-automated, or manual techniques of machine learning and deep learning in the decentralized Master Knowledge Generator 10 to sequester the CPS resources comply to a data governance framework that governs all use of data and is "regulations ready" as per the Master Contract 111 and the data resources complete an identification process for Workforce 1 or 4 verification, or for other regulatory needs, such as Third-Party approvals relating to regulatory compliance or Workforce certification. The identification process covers the removal of all Workforce Personal Identifiable Information (WPII), is stored in separate regulatory database 11.

The decentralized Master Knowledge Generator 10, and the public database(s) 12 draw upon data from a range of data resources. The public database(s) 12 may be Web 3.0 applications such as Blockchain or software-based and includes data access tools for drawing information from the various resources as described below or coordinating or translating the access of such information. In general, the public database(s) will unify raw data into a useable form. Any suitable form may be employed, and multiple forms may be employed, where desired, including hypertext markup language (HTML) extended markup language (XML), and so forth. In the present context, the Integrated Knowledge Base 13 is considered to include any and all types of available data which can be processed by the decentralized Master Knowledge Generator 10 and made available for providing the desired research. In the simplest implementation, data may include a single source of data or more conventional data extraction techniques (e.g., questionnaires completed by the Workforce). However, the data may include many more and varied types of data. In general, data within the databases and Integrated Knowledge Base are digitized and stored to make the data available for extraction and machine learning and deep learning analysis by the database(s) and the decentralized Master Knowledge Generator 10. Thus, even where more conventional data gathering resources are employed, the data is placed in a form which permits it to be identified and manipulated in the various types of analyses performed by the decentralized Master Knowledge Generator 10.

The Integrated Knowledge Base 13 is intended to include one or more repositories/resources of real estate development and construction/manufactured housing related data in a broad sense. The decentralized Master Knowledge Generator 10 is intended as an interface and translator between the repositories/resources, including the Integrated Knowledge Base 13, as illustrated and explained in FIG. 3 herein, and has the processing capabilities for carrying out desired operations on the data, including machine learning and deep learning analysis, judgement, reporting, display, and outbound communication message directly to the Workforce and/or between the various third-party inspectors (based on criteria such as, but not limited to weld verification, material purchase verification, building component delivery verification, quality condition, the severity of that condition, the age and weight and history of the building component or Workforce), or other functions. The data itself may relate to building component-specific characteristics as well as to non-building component specific information, as for classes of materials, jurisdictional building code requirements, building type and so forth. Moreover, the repositories/resources may include devoted systems for storing the data, or memory devices that are part of disparate systems. As noted above, the repositories/resources making up the Integrated Knowledge Base may be expandable and may be physically resident at any number of locations, typically linked by dedicated or open network links. Furthermore, the data contained in the Integrated Knowledge Base 13 may include both Workforce data (i.e., data relating specifically to a Workforce condition) and trial data. Trial data may include data representative of populations, census data, physical resources (as at an institution or supplier), human resources, and so forth.

The Workforce 1, or third-party inspector 7 may interact with the decentralized Master Knowledge Generator 10 through conventional input devices, such as keyboards, computer mice, touch screens, portable or remote input and reporting devices. Moreover, the links between the decentralized Master Knowledge Generator 10, the Integrated Knowledge Base 13 and the public and private database(s) may include computer data exchange interconnections, network connections, local area networks, wide area networks, dedicated networks, virtual private network, and so forth.

As noted above and with respect to FIG. 3, the database resources may generally be thought of as information repositories which include means for acquiring public agency, financial, real estate, mechanical assembly, habitable structure, safety and security data and protocols through automated, semi-automated, or manual techniques in the decentralized Master Knowledge Generator 10. Such resources may be thought of as including certain general modules such as an acquisition module 17, a processing module 18, an machine learning and deep learning analysis module 19, a report module 20, and an archive module 21. The nature of these various modules may differ widely, of course, depending upon the type of resource under consideration. Thus, the acquisition module 17 may include various types of electrical sensors, transducers, circuitry, imaging equipment, and so forth, used to acquire raw Workforce and Third-Party data. The acquisition module 17 may also include more real world data collection or data collection from human-based systems, such as questionnaires, surveys, forms, computerized and other input devices, and the like or may acquire data using Web 3.0 applications such as Blockchain, software or hardware working with a technology tracker allowing integration of tracker data with the reporting of information in the report module 20 used to monitor and collect data such as geographic locations of property lines, utility lines, jurisdictional distinctions, elevations, traffic patterns, weather patterns, seismic patterns, temperature and other real world conditions. The report module 20 is configured to provide an alert where the Workforce 4 or Third-Party Inspector 7 is completing the tasks assigned in the STANWO 3 or to assist and remind the Workforce 4 and Third-Party Inspector 7 when to complete/administer the STANWO 3 to to increase Workforce 4 compliance which also provides a higher consistency of data collection for Third Party Verification 7. The report module 20 also sends out communication reminders informing the Workforce 1 and 4, and Third-Party Inspector 7 when the optimal time to execute the next task in the STANWO and initiates a request to the Workforce 1 or 4 or Third Party Inspector 7 via the acquisition module 17 to complete a data acquisition or verification process. The machine learning and deep learning analysis module 19 also tracks improvement of efficiency and compares the information among a larger population of smart factories and structures to develop a standardized product (as the STANWO 3 defines), including configuration of structure, including specifications of building type, number and type of units in the smart factory or structure, the size and types of modules and finished units, the number and type of modular bathrooms, kitchens, parking structures, mixed-use type configurations, color, natural disaster safety level, as well as manufacturing production information such as Workforce requirements, financial and regulatory requirements, building material and building component requirements, production schedule, delivery schedule and cost of a newly available real property/land parcel where, for example, that a municipality, state or federal agency has a real property/land parcel option to utilize a smart factory 901 or structure 705, which would be entered into the invention/system by a decentralized CPS Node 2.

The nature and operation of the processing module 18, similarly will depend upon the nature of the acquisition module and of the overall resource type. Processing modules may thus include data conditioning, filtering, augmentation, and may also include such applications as spreadsheets, data compilation Web 3.0 applications such as Blockchain or software, and the like. In electrical and imaging systems, the processing module may also include data enhancement circuits, Web 3.0 applications and software used to perform image and other types of data scaling, reconstruction, and display.

Analysis module 19 may include a wide range of applications which can be partially or fully automated. In electrical and imaging systems, for example, the machine learning and deep learning analysis module may permit users to enhance or alter the display of data and reconstructed images, for example with finished or unfinished production processes such as site verification, finished or unfinished welds, carpentry, steel cutting, painting, geographic movement of the building component or module while being shipped. The machine learning and deep learning analysis module may also permit some organization of third-party-collected data from Third-Party Inspectors 7 or Public 12, Regulatory 11, and Private 9 databases for evaluating the data or comparing the data to reference ranges, and the like for example, for verifying or collecting data on the number of building module 704s are produced by each smart factory 901, the cost of each smart factory, building module 704, building component and building material as well as what geographic neighborhoods by jurisdiction, population and municipality the building module 704s were delivered to create the modular smart factories and structures, as well as conduct machine learning and deep learning analysis on completed smart factories and structures for the purposes of identifying hazard alerts such as seismic, wind, water, fire, temperature, explosive, biological, chemical loads, geotechnical and other environmental loads measuring disturbances and transmits data from a remote decentralized CPS Node 2 using Wi-Fi, or using decentralized CPS Nodes 2 such as internal climate sensors that track fire, life and safety related STANWO 3 and monitor the air quality, temperature, moisture, smoke, and carbon dioxide in smart factories and structures or using the CPS to track and modify the ability to change light color, intensity and temperature of lights based on programmed systems defined in a relevant STANWO, 7.

The report module 20 typically provides for an output or summary of the machine learning and deep learning performed by module 19. Reports may also provide an indication of techniques used to collect data, the number of data acquisition sequences performed, the types of sequences performed, Workforce conditions during such data acquisition, and so forth. Finally, the archive module 21 permits the raw, semi-processed, and processed data to be stored either locally at the acquisition system or—resource, or remote therefrom, such as in a database, repository, archiving system, Web 3.0 application such as Blockchain, and so forth.

The typical modules included within the controllable resources may be interfaced with programs (CAX) 30, to enhance the performance of various acquisition, processing and machine learning and deep learning analysis functions. For example, various computer-assisted acquisition (CAA) routines 22 may be available for analyzing previous acquisition sequences, and for controlling or configuring subsequent data acquisition routines. Similarly, decentralized computer-assisted processing (CAP) modules 23 may interface with the processing module 18 to perform additional or enhance processing, depending upon previous processing and machine learning and deep learning analysis of acquired data. Finally, programs such as computer-assisted data operating algorithms (CAD) modules 24 may be used to analyze received and processed data to provide some indication of possible findings that may be made from the data.

A non-limiting example of a specific CAA routine 22 includes data acquisition to ensure the data quality captured through decentralized CPS Nodes 2, such as a certified welding apparatus in a smart factory 901, using robotic systems to complete a welding process between the vertical steel posts of the main structural column require certain length welds and double the inspection if such vertical steel posts are within a certain distance of a steel sheer wall using a particular type of steel and thickness, to comply with pre-determined structural engineering requirement as defined in a STANWO 3 which states that the approved production building module 704 or component (vertical steel post, weld, sheer wall for instance), requires a certain more intensive verification of the specific welds mentioned above from a proper electrode size, with gas selection and grade, which requires the Workforce 1 or 4 and decentralized CPS Node 2 or 5 to verify that the welding process completed complies with the latest California State Building Code requirements for welding pertaining to public schools in California (such as *IR* 17-3, *Structural Welding Inspection:* 2019 CBC), and recorded in the Electronic Building Master (CBCM) 6, or the decentralized CPS Node 2 or 5 will fail to initiate the current and next production task as defined in the STANWO 3.

In parallel to this for the purposes of third party verification, safety and maintenance oversight, and still part of the same example used above, while the Workforce 1 or 4 completes the production verification STANWO tasks (or stops because of a failure to comply with the STANWO in question, or a safety protocol is initiated or system malfunction is identified) an independent certified third-party 7, who is authorized by its own STANWO authentication 3 is alerted regarding the specific completion of verification (or system alert of non-verification, malfunction or safety concern) and seeks to identify, collect data and verify its own independent conclusion using machine learning and decentralized artificial intelligence for the purposes of verifying the procedure and initiating the proper procedure to proceed to the next stage gate, which as described earlier in FIG. 3 is communicated by the Reporting Module 20 and recorded in the Electronic Building Record (EBR) 8, and then follows its next standardized protocol initiated in the decentralized Master Knowledge Generator 10.

For a non-limiting example, such as when the invention/CPS system for the standardized production of housing, or habitable structures is used with third-party contracts with a real estate developer (Developer) to develop and build a school/structure, with a California Department of Education Fund (CDE Fund or Bank) who is contracted to finance the school/structure production, which requires a government regulatory agency such as California Division of the State Architect (DSA or Regulator) to contract for the purposes of regulatory compliance oversight for the production and delivery for the school or school district (customer), the parties enter in to a collective master contract STANWO 3 (using decentralized CPS Nodes 2 and 5 such as any computing system, such as a computer, tablet computer, smart phone, etc.) to initiate production with a properly licensed and certified Workforce 1 or 4 operating the CPS System using the invention's Web 3.0 Blockchain application to (i) identify real property/land parcel that is owned by the contracting Customer by using data stored in public 12, private 9, regulatory 11, or integrated knowledge databases 13 which contains aggregated and verified geospatial information on school jurisdictional zones, property lines, population information, geospatial regulatory information (such as zoning codes, entitlement data, real property identification and so forth) and (ii) that complies with standardized regulatory building requirements set by DSA which are specifically detailed and validated in unique STANWOs 7 (such as DSA standard *IR A-9, Site Improvements for School Building Projects, Revised* 03/11/20 *under* 2019 *CBC*), and is independently verified by the contracted Bank which disperses the standardized monies in accordance with standardized distribution of funds protocol defined the collective master contract STANWO 3 (such as the *California Department of Education Principal Apportionment protocol*, which may or may not be operated by a human or DAI controlled by Bank using authorized third party inspector 7), which once approved by the Bank, the transaction is recorded in the Electronic Building Components Record (EBR) 8, and a notification to proceed to the next STANWO is distributed to the various Workforce to initiate the procurement, verification and production of certain standardized building components and modules detailed in the collective master contract STANWO and to notify and initiate other Third Party Inspectors contracted to use the CPS System, or including for example, if the production continues and the necessary authorization stage gates are concluded a STANWO will release of building module 704*s* from the smart factory 901, and assign a trackable mobile decentralized CPS Node 2 or 5 such as using Web 3.0 applications that connect to the CPS System that are permitted to collect GPS and RFID coordinates on a train, truck or ship to deliver the building module 704 or component to the Customer's location for assembly when a specific, unique building module 704/component-related STANWO 3 is completed. The Workforce 1 or 4 and the independent the Third Party Inspector 7 verifies each production task or STANWO recommendation strengthening the compliance of the collective master contract STANWO for all interested parties records the various transactions verified and collected within the third party Electronic Building Components Record (EBR) 8 and independently records all of the Workforce 1 and 4 transactions and verifications in the parallel but independent Electronic Building Master (EBM) 6, where the CAA 22 is used for ensuring the completeness and accuracy of the required data submission as defined by the Acquisition Module 17 verifying it against the contract specified within each STANWO 3 such as proper placement and installation of the building module 704*s*, proper procurement of building components, adherence to specific electrical building codes and so forth. If quality assurance data was collected and the standardized amount of spray foam insulation had not been dispensed into the wall cavity of the building module 704 as defined in the STANWO, or the spray foam insulation was only partially dispensed, or the data collected seems to indicate an anomaly (such as varying degrees of spray foam insulation used), the CAA will initiate a routine to collect new information from the Acquisition Module 17 until the data is deemed acquired, complete and accurate by the CAA 22. This ability of the invention ensures the "already in use" data requested by the Acquisition Module 17 is captured (and ultimately utilized) with a high degree of accuracy, and can be monitored for inaccuracy, A non-limiting example of enhanced processing by the CAP module 23 includes data append routines that involve adding new data elements to existing Private Database 9 to enrich already captured information and allows the components and data within the invention to be upgraded for capturing additional data through additional decentralized CPS Node sensors or for upgrading existing decentralized CPS Node sensors. A non-limiting scenario where this would occur, and the CAP module 23 would be utilized would be when adding an additional remote decentralized CPS Node 2 for emergency response needs in smart factories or structures and the decentralized CPS Nodes once connected to the CPS System are used for water detection, vapor control, moisture control, humidity control, condensation control, and with the decentralized CPS Node having decentralized computing power, the decentralized Master Knowledge Generator 10 will dispatch a STANWO 3 for fire safety (by turning on the fire sprinkler system), water and signaling the fire extinguishing system, or smoke detection or extraction system. This enhanced processing by the CAP module 23 ensures more robust machine learning and deep learning analysis in this example by increasing the decentralized CPS Node 2 or 5 and increases the flexibility of the machine learning and deep learning analysis by having the functionality to add or modify the analysis criteria as needed.

A non-limiting example of how the CAD module 24 works to analyze data and provide findings include using decentralized artificial intelligence routines to provide the ability to automate difficult cognitive tasks using "big data" for the purposes of learning abstract features from the raw data and augmenting decision making for the differential recommendations of a real estate development or manufacturing production process and predicting the time, cost and resources needed to standardized produce smart factories and housing, or if there is inefficient data for the CAD module 24 to make a decision of reasonable certainty of the standardized delivery of structures using criteria defined in a STANWO 3 which encompasses a wide population, yet has a high enough certainty in the deep learning obtained to continue the investigation, the CAD module 24 will initiate a routine with a program within the invention, CAX 30 that will initiate computer automated routines within the CAA 22 to request and acquire more recent data (such as newly acquired property addresses or additional financing resources) from the Third Party Inspector 7, and initiate routines within the CAP 23 to append additional data (such as schematic configurations of standardized building module 704*s* that fit within the guidelines of third party regulators such as DSA and Banks) to enhance the research. In this scenario, both computer automated processes collectively enhance the decentralized artificial intelligence increasing the predictability of the CAD module 24 being able to recommend a new STANWO 3 with a higher degree of certainty and accuracy.

In the present disclosure regarding the decentralized Master Knowledge Generator 10 and the various types of controllable resource types and modalities, as well as of the modules used to aid in the acquisition, processing, machine learning and deep learning analysis and predictive functions performed on the data from such resources, it should be noted that various links between these components and resources are available. Thus, in a typical application, a computer-assisted acquisition (CAA) module 22 may control or configure subsequent acquisition of data, such as video data, based upon the results of enhanced processing performed by a decentralized computer-assisted processing (CAP) module 23. A non-limiting example of how the CAA module 22 controls or configures acquisition of video data includes using a data acquisition routine via mobile crowd-sensing where video data is acquired using built-in sensors of a smart device such as a camera and a digital "chirp" used at a scheduled Workforce 4 or Third Party Inspector 7 STANWO 3 scheduled event where the crowd-sensing device captures a close up video of the Workforce's completed task as defined in the STANWO 3, measuring the visual weld quality to determine if the building materials purchased match the specification for the STANWO 7 defined base metal size and type and used the proper electrode size, gas selection and grade and that there are no building material defects or contaminants such as rust, scale, mill lamination etc, and that all building materials are prepared for correct angles after the use of a decentralized CPS Node 5 completes its task or routine that is defined by a STANWO completion notice 3 and is recorded in the Electronic Building Master of the results and quality of the task or routine 6 which also notifies the Third Party Inspector 7 to verify such completion and record its independent findings using a similar or different testing protocol as the Workforce 4 and records its independent transaction in the Electronic Component Record 8 which ultimately becomes part of the machine learning and decentralized artificial intelligence gained through the decentralized Master Knowledge Generator 10 explained in FIG. 3.

Similarly, such acquisition may result from output from a computer-assisted diagnosis (CAD) module 24, such as to refine potential recommendations made, based upon subsequent data acquisition 2. The CAD module 24 refines recommendations by applying decentralized artificial intelligence to a complex set of data from external sources. For example, using the same pupil video data captured previously discussed, the deep learning created via CAD 24 with the collective data in the internal Private Database 9 can assess and predict an estimated probability of a condition, and then apply this deep learning to the decentralized Master Knowledge Generator 10 which is then used to apply and compare the findings to other external sources such as a Public Database 12 researching the effectiveness of a prescribed STANWO 3 at a different decentralized CPS Node 2 within the system or used the increased intelligence gained and apply the learnings by using and Integrated Knowledge Base 13 where deep learning is conducted across multiple product types, real property/land parcel types, jurisdictions, populations, building codes, smart factory or structure designs that correlate between different elements of the invention or outside world environment that were previously unknown.

In a similar manner, a decentralized computer-assisted processing (CAP) module 23 may command enhanced, different or subsequent processing by decentralized processing module 18 based upon output of computer-assisted (CAA) module 22 or of a decentralized computer-assisted diagnosis (CAD) module 24. For example, the decentralized CAP module 23 commands enhanced or different processing by processing routines that aggregates data and appends probability scores of high correlation (conducted by the decentralized CAD 24 processing routine) between multiple, previously unknown factors such as is the fabrication process completed in the building module 704 within the production facility, what geographic location for the next building component is required as defined in the next corresponding STANWO 3 to be dispatched in the process (which could be in a inventory warehouse in another state and requires a new delivery time to be factored into the equation) and what is the new estimated delivery schedule is of not only the unique building module 704 requiring the additional building components to be assembled, but also updates the EBM 6 records for the other associated building module 704s and their locations and completion status identified within the master contract STANWO 3 which is then recorded in each of the individual EBMs 6 in question, which by means of conducting multiple processing sequences by the decentralized CAD 24 processing routine, a new project delivery schedule is updated for each building module 704 as well for the total building models that are called for in the master STANWO 3. More specifically, the CAP module 23 processing routines are conducted across multiple databases such as a Private Database 9 that holds internal data to the system, like the EBM 6 for each building module 704, Public Database 12 that houses and generates data from external third party organizations that analyze the same objectives as the internal team, such as a Bank, DSA/regulatory or Customer, and Integrated Knowledge Bases 13 that may determine an entirely different conclusions for the purposes of increasing the speed, efficiency and quality while lowing the overall cost of the standardized production, delivery and use of the present disclosure regarding smart factories and structures. The various modules, resources, and programs, including Web 3.0 applications such as Blockchain, then, permit a high degree of cyclic and interwoven data acquisition, processing and machine learning and deep learning analysis by virtue of the integration of these elements into the overall system in accordance with the present techniques.

Also, for the typical controllable resource, the programs executed on the data, and used to provide enhanced acquisition, processing and machine learning and deep learning analysis, may be driven by a decentralized logic engine 25 of the programs 22. As noted above, and as discussed in greater detail below, the decentralized logic engine 25 may incorporate a wide range of algorithms which link and integrate the output of programs, such as CAX algorithms, certain of which are noted as CAA, CAP and CAD modules 22, 23 and 24, and which prescribe or control subsequent acquisition, processing and machine learning and deep learning analysis based upon programmed correlations, recommendations, and so forth. As also noted above, the decentralized programs CAX 30 are accessed by and implemented via the decentralized computing resources 26. The decentralized computing resources 26 may interface generally with the also decentralized archive module 21 of the resource modality via an appropriate interface 27 as mentioned above. Finally, the decentralized computing resources 26 interface with the decentralized Integrated Knowledge Base 13 and decentralized Regulatory Database 11. It should be noted that the Integrated Knowledge Base 13 and Regulatory Database 11 may include modality-specific interfaces 29 which access repositories of information relating to the specific modality of the resource 13, 11, 18-21 and 26, such as delivery schedules and production cost calculations of particular building module 704s, updated or new DSA/Regulatory inspection criteria, which are then processed through decentralized modules 18-19, which executes a priority status report 20 to the Workforce 1 and 4, Third Party Inspectors 7 and the Integrated Knowledge Base 13 to archive the previously active STANWO 3 for delivery with a new STANWO and notifies the decentralized computing resources 26 of new demands. Such modality-specific interfaces may include factors such as system settings, preferred settings for specific Workforces 1, Third Party Inspectors 7 or relevant populations, routines and protocols, data interpretation algorithms based upon the specific modality, and so forth.

FIG. 4 is a table depicting various types of decentralized resources, and the modalities of such resource types may include any available data resources which can be useful in performing the acquisition, decentralized processing, machine learning and deep learning analysis functions offered by the present techniques. Specifically, the present technique contemplates that as few as a single decentralized resource may be provided, such as for integration of acquisition, processing and machine learning and deep learning analysis over time, and, in a most useful configuration, a wide range of such decentralized resources are made available.

As noted above, such controllable resources may generally include real world data, electrical data sources, imaging data sources, testing data sources, building module 704 or finished structure data sources, regulatory data sources, financial data sources and other miscellaneous sources of public agency, financial, real estate, mechanical assembly, habitable structure, safety and security data and protocols. While various reference data on each of these types and modalities may be included in the data resources, the types and modalities enumerated in the table are designed to acquire data which is STANWO-specific 7 and is acquired either directly or indirectly from a decentralized Workforce 1 or 4, or is Third Party specific data 7, 9, 12 or 11, following the necessary contracted regulatory, financial and customer protocols, or the data in non-Workforce-specific routines could include data from housing studies and research, general market and Workforce data, and geographic data referring to a particular population and so forth sourced from data resources defined in FIG. 2.

Thus, in various embodiments, the invention includes three "principal" aspects. The first is a CPS system for data acquisition, machine learning and deep learning analysis and mechanical execution. The system is typically in the form of a computer system operating Web 3.0 application such as Blockchain or software or in the form of a verifiable and traceable instruction set or STANWO 3. This system may be incorporated into a wide variety of devices that provide different functionalities. The second principal aspect is a method, typically in the form of Web 3.0 application such as Blockchain, software or hardware, operated using one or more networked data processing systems (computer) as implemented on any computing system, such as a computer, tablet computer, robotic arm using sensors or mechanical instruments, virtual or augmented reality goggles, smart phone, etc. The third principal aspect is a computer program product. The computer program product generally represents computer-readable instructions stored on a non-transitory computer-readable medium such as a hard drive, optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 5:
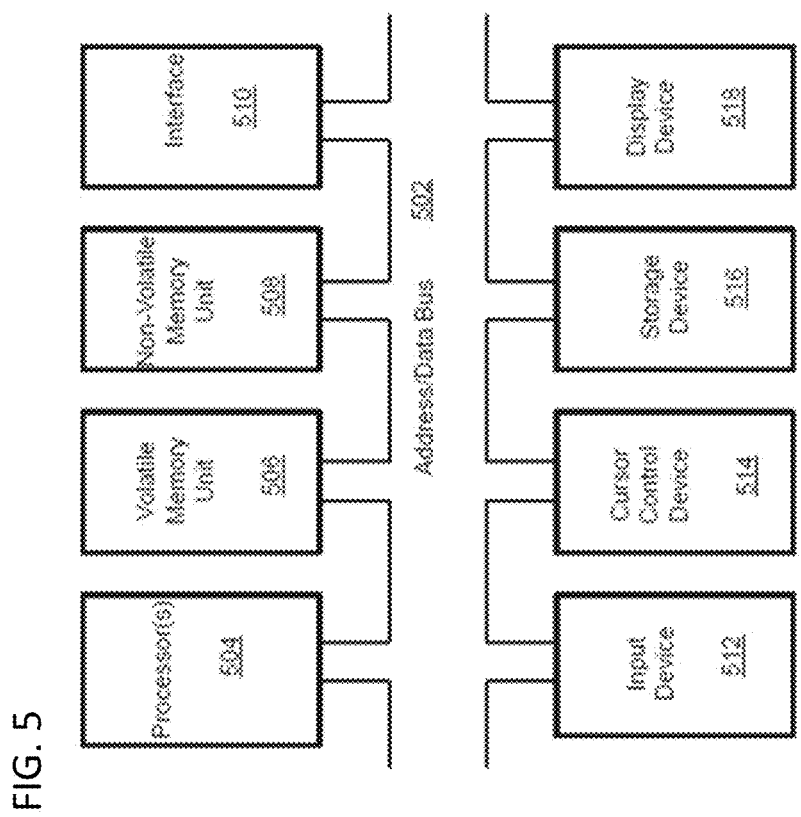
FIG. 5 is a block diagram depicting the components of a system according to various embodiments of the present invention.

A schematic diagram depicting an example of a CPS system of the present invention is provided in FIG. 5. The Decentralized CPS System is configured to perform calculations, processes, operations, and/or functions associated with a program or algorithm. In one aspect, certain processes and steps discussed herein are realized as a series of instructions (e.g., software program or Web 3.0 application such as Blockchain) that reside within computer readable memory units and are executed by one or more processors of the decentralized CPS System. When executed, the instructions cause the decentralized CPS System to perform specific actions and exhibit specific behavior, such as described herein. In various aspects, the decentralized CPS System can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes as may be necessary to implement the invention as described herein.

The decentralized CPS System may include an address/data bus 502 that is configured to communicate information. Additionally, one or more data processing units, such as a processor 504 (or processors), are coupled with the address/data bus 502. The processor 504 is configured to process information and instructions. In an aspect, the processor 504 is a microprocessor. Alternatively, the processor 504 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The decentralized CPS System is configured to utilize one or more data storage units. The decentralized CPS System may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The decentralized CPS System further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the decentralized CPS System may execute instructions retrieved from an online data storage unit such as in "Cloud" computing. In an aspect, the decentralized CPS System also may include one or more interfaces, such as an interface 510, coupled with the address/data bus 502. The one or more interfaces are configured to enable the decentralized CPS System to interface with other electronic devices and computer systems, including other tablets, phones, or other items as may be applicable to implementing the invention as described herein. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 504 can be associated with one or more associated memories, where each associated memory is a non-transitory computer-readable medium. Each associated memory can be associated with a single processor 504 (or device), or a network of interacting processors 504 (or devices), such as a network of devices (e.g., individual computers/tablets/phones, etc. as used by users to upload or otherwise implement the invention as described herein)

In one aspect, the decentralized CPS System may include an input device 512 coupled with the address/data bus 502, wherein the input device 512 is configured to communicate information and command selections to the processor 504. In accordance with one aspect, the input device 512 is an alphanumeric input device, such as a keyboard, that may include alphanumeric and/or function keys. Alternatively, the input device 512 may be an input device other than an alphanumeric input device. In an aspect, the decentralized CPS System may include a cursor control device 514 coupled with the address/data bus 502, wherein the cursor control device 514 is configured to communicate user input information and/or command selections to the processor 104. In an aspect, the cursor control device 514 is implemented using a device such as a mouse, a trackball, a trackpad, an optical tracking device, or a touch screen. The foregoing notwithstanding, in an aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In an aspect, the decentralized CPS System further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In an aspect, the display device 518 may include a cathode ray tube ("CRT"), liquid crystal display ("LCD"), field emission display ("FED"), plasma display, touch screen display on a mobile phone, tablet, or computer, or any other display device suitable for displaying video and/or graphic images and alphanumeric characters recognizable to a user.

The decentralized CPS System presented herein is an example computing environment in accordance with an aspect. However, the non-limiting example of the decentralized CPS System is not strictly limited to being a computer system. For example, an aspect provides that the decentralized CPS System represents a type of data processing machine learning and deep learning analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform tasks or implement abstract data types. In addition, an aspect provides that one or more aspects of the present technology are implemented by utilizing one or more distributed computing environments, such as where tasks are performed by remote processing devices that are linked through a communications network, or such as where various program modules are in both local and remote computer-storage media including memory-storage devices.

Figure 6:
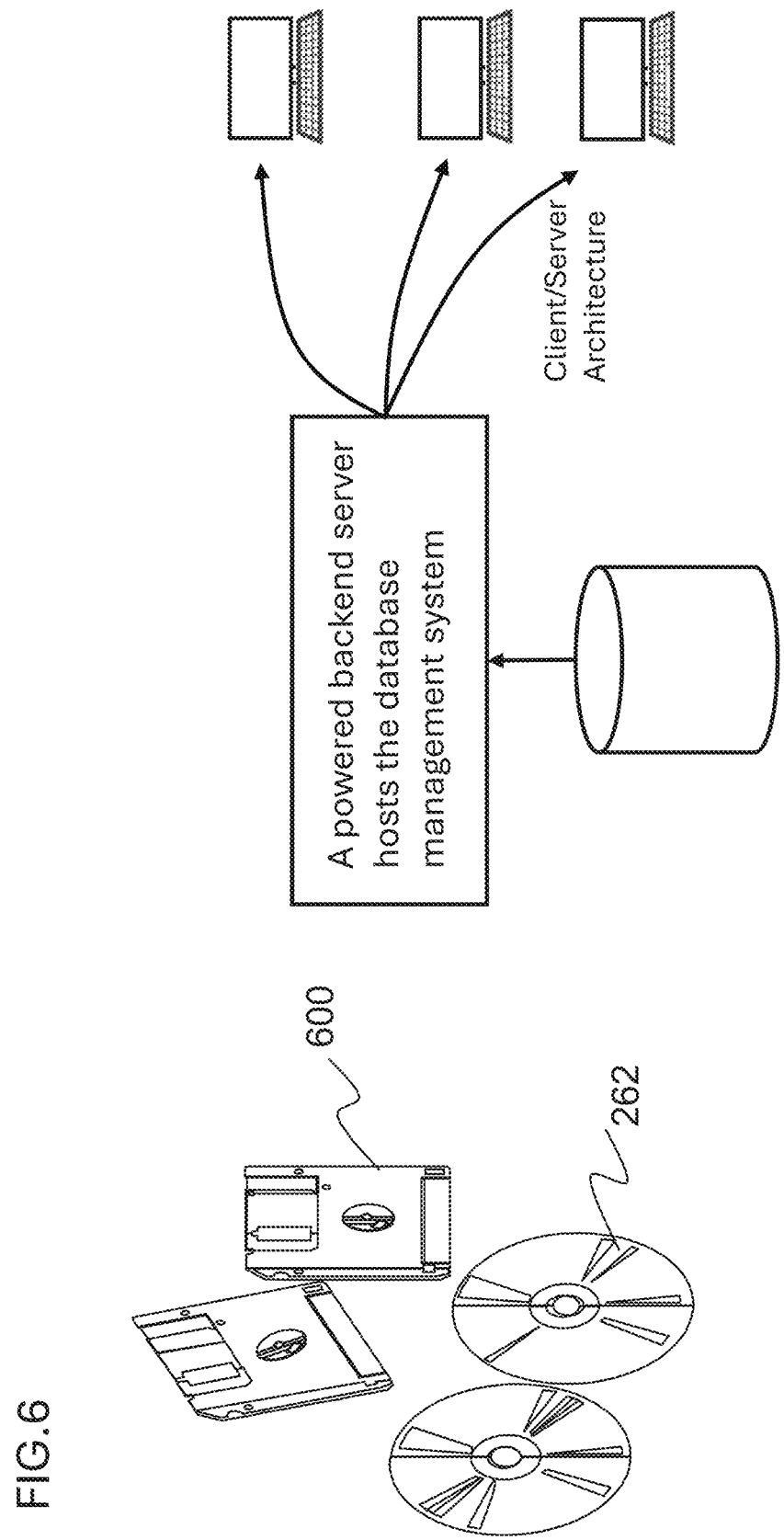
FIG. 6 is an illustration of a computer program product embodying an aspect of the present invention.

An illustrative diagram of a computer program product (i.e., storage device) embodying the present invention is depicted in FIG. 6. The computer program product is depicted as floppy disk 600 or an optical disk 602 such as a CD or DVD. However, as mentioned previously, the computer program product generally represents computer-readable instructions stored on any compatible non-transitory computer-readable medium. The instructions can be transmitted and or downloaded for use by individual user on their individual device or otherwise stored on a platform for operation by an associated processor. The term "instructions" as used with respect to this invention generally indicates a set of operations to be performed on a computer and may represent pieces of a whole program or individual, separable, software or Web 3.0 application such as Blockchain modules. Non-limiting examples of "instruction" include computer program code (source or object code) and "hard-coded" electronics (i.e., computer operations coded into a computer chip). The "instruction" is stored on any non-transitory computer-readable medium, such as in the memory of a computer or on a floppy disk, a CD-ROM, and a flash drive, or in the hard drive of a smart phone, tablet computer, etc. In either event, the instructions are encoded on a device as non-transitory computer-readable medium.

According to one non-limiting example of the present invention, there is provided a modular building system executed by the decentralized CPS system comprising individual building module 704s manufactured and assembled at a manufacturing facility. The modules and related modular components are optimized for transportation, and are transported to a building site by conventional ocean, rail, air and truck delivery systems using temporarily attached standard ISO shipping adaptors. Once on site, the modules may be modularly assembled into conventional-looking buildings as illustrated in FIG. 7 or FIG. 9.

The individual building module 704, as shown in FIG. 7 or FIG. 9, are the core units of the modular building system of the present invention. Final structures/buildings 705 or 901 or as illustrated in FIG. 7 or FIG. 9 may be assembled by attaching together a plurality of the structurally self-supporting modules. The modules may be attached horizontally adjacent to one another, stacked vertically above and below one another, or both horizontally attached and vertically stacked using a variety of specialized, interchangeable adaptors between adjacent and stacked building module 704s. The modules may also be offset horizontally, vertically or perpendicularly to one another as defined by the decentralized CPS.

In a preferred embodiment of the present invention, each building module 704 is manufactured using steel columns 702 and beams 703 welded to form an open framework, as may be seen in FIG. 7 or FIG. 9, which depict a plurality of such building module 704s. Preferably, each building module 704 is approximately 8 feet wide by 53 feet, 40 feet, 20 feet or 10 feet long by 9.5 feet high, although other dimensions are also within the scope of the invention. The ceiling preferably is constructed of conventional steel deck. Preferably, the floor is constructed of steel deck and may be covered with concrete. Alternatively, pre-cast, pre-stressed concrete may be used for the floor assembly between the steel floor beams. The resulting basic building module 704 is an open structure with a ceiling structure, a floor structure parallel to the ceiling structure, and four corner columns, each column joining one corner of the ceiling structure to a corresponding corner of the parallel floor structure. Each of the corner columns includes receiving means on each end for receiving one of a variety of corner adaptors. Optionally, intermediate columns may be desirable between the corner columns, depending on the structural requirements of the building, including length and load requirements.

Walls may be constructed along the sides of each building module 704 between the columns using steel studs, drywall, panels, windows and doors. One or more sides of each building module 704 may be left open where multiple modules are to be connected together to form a living space larger than 8 feet by 40 feet, such as an apartment or single-family home, or a commercial space such as an office or live-work studio, homeless shelter, school or similar habitable structure. Further, a plurality of building module 704s may be assembled into a multi-level installation such as a hospital or penal institution, apartment building, multi-use residential building or similar. Where fire rating and non-combustible construction are of less importance, for example, single or some forms of multi-family housing, wood beams and other structural wood components may be used in one or more walls, or ceilings, or floors. Each basic module, comprising a ceiling, a floor, columns and walls may be finished at a CPS factory 901, prior to transportation to a building site. Numerous elements may be installed in each basic building module 704 at the factory 901. These elements include interior and exterior walls, floors, ceilings, building envelope and roof assemblies. These may also include wall coverings, carpeting, flooring and other finishes.

Another element which may be added to each building module 704 at the decentralized CPS factory 901, is the electrical distribution system, including the electrical breaker panel, lighting and light fixtures, switches, dimmers, plugs, fans, appliances, air handlers, heat pump components, furnaces, electric baseboards and fire-places, thermostats and controls.

Similarly, the plumbing system may be pre-installed in the decentralized CPS factory. Plumbing distribution and connections installed may include all plumbing fixtures including toilets, sinks, waste disposal units, hot water tanks, washers, dryers, hot and cold-water distribution conduits, faucets, baths and showers. All of the plumbing components may be connected to hot and cold-water mains and risers and drainage, as desired.

The heating, ventilation and air conditioning units and air distribution ducts and associated electrical connections may also be installed in the factory.

Ceiling, floor and wall finishes including paint, wallpaper, floor coverings and baseboards may be pre-in-stalled in the factory, as may all cabinetry including kitchen, bathroom, laundry, and closet or storage cabinetry. Further, any tiles, marble, granite, bathroom and kitchen countertops, and accessories may also be added in the factory, along with doors, windows, trim and other surface finishes. Kitchen, laundry and any other appliances may also be pre-installed in the factory.

Once all structural components have been added in the factory, a fire-rated drywall membrane may be factory installed over all structural components to achieve the required fire rating. The fire rated drywall may be installed prior to the ceiling finish. The perimeter drywall will also contribute to achieving the required fire rating standard between apartments. The ceiling and floor assembly with the drywall on the lower apartment and concrete on the floor of the upper apartment provides vertical fire rated separations between apartments. Fire stops, as required, may be inserted in the walls between apartments where there is a space between adjacent apartments. Electrical wiring may be run internal or external to the fire-rated membrane. A decorative layer such as an additional drywall ceiling finish may be applied over the electrical wiring, plumbing and heating, ventilation and air conditioning equipment. Preferably, all material used in construction of the modules is non-combus-tible to obtain a non-combustible classification for the modular building system of the present invention. However, combustible materials may also be used if desired.

The modules of the present invention are engineered and designed to comply with US, Canadian, and European building codes, and are manufactured to accept required third party certification 7 and labels. Modification of the building module 704s to comply with other building codes and required certification and labelling requirements is within the scope of the present invention.

At the land parcel or building site, the building module 704s may be assembled onto a foundation, laterally spaced and secured, and stacked into desired configurations.

Building module 704s of the present invention may be designed to be interconnectable to form a wide variety of apartment types using a limited number of building module 704 types. For example, the kitchen or bath module of the present invention may be substantially similar for a range of apartment types including a studio apartment, a 1-bedroom apartment, a 2 bedroom 2-storey apartment, a 3-bedroom apartment, or other apart-ment configurations.

Each building module 704 is constructed with corners having corner receptors, adaptable to specialized corner adaptors. Individual building module 704s may be connected to horizontally adjacent and vertically stacked modules using selected function-specific adaptors.

The corner adaptors are interchangeable and are adapted for several potential purposes. For example, transportation adaptors may be attached to modules for shipping using methods associated with standard ISO handling and transportation. Once on a building site, these adaptors may be removed, and specialized corner adaptors may be attached to the modules for specific purposes consistent with the function and location of a particular module within the finalized structure/building.

In addition, corner adaptors, may be used to connect one building module 704 to a vertically adjacent module at the corners of the building. Another component of the system of the present invention is a vertical spacer, which may be used to provide a properly vertically spaced connection between columns of the building module 704s. Vertical connections may be formed by combining a corner adaptor with a spacer, or a corner adaptor with a lateral adaptor, and may be used to connect columns of vertically and/or horizontally adjacent modules.

The building module 704 system of the present invention is easily adaptable to sustainable technologies, including grey water re-use, geo-thermal, solar technologies, and other emerging green building technologies.

In another of its aspects, the building system of the present invention includes an interactive building planning software tool which may be made available online via the Internet. The building planning software offers drag and drop tools for users to assemble building models from a selection of standard building system components. The user may con-figure a mix of apartment types and floor layouts. The resulting building model may be viewed and rotated in three dimensions.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas any elements that do not specifically use the recitation "means for", are not intended to be read as means-plus-function elements, even if the claim otherwise includes the word "means". Further, while method steps have been recited in a particular order, the method steps may occur in any desired order and fall within the scope of the present invention.

What is claimed is:

1. A decentralized artificially intelligent cyber-physical system for standardized production of standardized building modules, comprising:
one or more processors and associated memory, the memory being a non-transitory computer-readable medium having executable instructions encoded thereon, such that upon execution of the instructions, the one or more processors perform operations of:
receiving pre-defined objectives according to a master contract, the pre-defined objectives including at least standardized production of one or more standardized building modules;
receiving, from a master knowledge generator, Workforce specific data as related to fulfillment of the pre-defined objectives;
receiving, from an integrated knowledge base, real-property information related to fulfillment of the pre-defined objectives;
generating a standardized work order (STANWO) recommendation for the Workforce based on the Workforce specific data and the real-property information;
receiving production data on the Workforce while the Workforce is executing at least a portion of the STANWO recommendation;
updating an Electronic Building Component Master for the Workforce based on the production data; and
causing one or more automated Workforce components to begin physically producing one or more modular components for the one or more building modules based on the STANWO recommendation.

2. The cyber-physical system as set forth in claim 1, wherein causing one or more automated Workforce components to begin physically producing one or more modular components includes an operation selected from a group consisting of causing a robotic system to weld two building components together, cutting building components, geographic movement of one or more building components, and painting one or more building components.

3. A decentralized artificially intelligent cyber-physical system for standardized production of standardized building modules, comprising:
one or more processors and associated memory, the memory being a non-transitory computer-readable medium having executable instructions encoded thereon, such that upon execution of the instructions, the one or more processors perform operations of:
receiving pre-defined objectives according to a master contract, the pre-defined objectives including at least standardized production of one or more standardized building modules;
receiving, from a master knowledge generator, Workforce specific data as related to fulfillment of the pre-defined objectives;
receiving, from an integrated knowledge base, real-property information related to fulfillment of the pre-defined objectives;
generating a standardized work order (STANWO) recommendation for the Workforce based on the Workforce specific data and the real-property information;
receiving production data on the Workforce while the Workforce is executing at least a portion of the STANWO recommendation;
updating an Electronic Building Component Master for the Workforce based on the production data;
one or more computer process system (CPS) nodes, the one or more CPS nodes being emergency response sensors that are operable for monitoring the one or more automated Workforce components; and
when the emergency response sensors are activated, the one or more processors further comprise an operation of causing an emergency response system to activate a physical response to mitigate an emergency as sensed by the emergency response sensors.

4. The cyber-physical system as set forth in claim 1, further comprising an operation of altering the STANWO based on the production data and causing the one or more automated Workforce components to execute an altered STANWO.

5. The cyber-physical system as set forth in claim 1, wherein the real-property information includes at least some of aggregated and verified geospatial information on jurisdictional zones, property lines, population information, and geospatial regulatory information.

6. The cyber-physical system as set forth in claim 1, wherein the master knowledge generator checks the personalized STANWO recommendation against a regulatory database to ensure regulatory compliance, such that if the STANWO is within regulatory compliance, then generating instructions to cause the one or more automated Workforce components to execute the at least a portion of the STANWO recommendation.

7. The cyber-physical system as set forth in claim 1, further comprising a computer-assisted acquisition (CAA) module, the CAA module operable for performing operations of:
receiving parameters detailing a resource type used to acquire data;
receiving parameters detailing a data type and condition of data to acquire;
receiving performance information from a device to capture the data;
transferring the data that has been captured to a processing module that allocates the data to a program (CAX) for machine learning and deep learning analysis;
reporting on the data obtained using a report module; and
archiving the data using an archive module.

8. The cyber-physical system as set forth in claim 1, further comprising decentralized computer-assisted processing (CAP) module, the CAP module operable for performing operations of:
receiving parameters detailing computer resources needed to access additional data;
receiving parameters detailing a source and data type to acquire the additional data;
receiving parameters detailing conditions to acquire the additional data;
updating a Workforce data record in the private database with the additional data;
transferring the additional data to other computer processing modules for machine learning and deep learning analysis and storage;
reporting on the data using the report module; and
archiving the data using the archive module.

9. The cyber-physical system as set forth in claim 1, further comprising a computer-assisted data operating algorithms (CAD) module, the CAD module operable for performing operations of:
receiving parameters, from a computer-assisted program detailing the data, a machine learning and deep learning analysis of the data, a type of the data, a source of the data and logic needed to conduct decentralized artificial intelligence routines that extract abstract features from the data and augment decision making for building purposes;

receiving parameters detailing the conditions to initiate the decentralized artificial intelligence routines;

updating a Workforce data record with the additionally acquired decentralized artificial intelligence/deep learning information obtained;

updating other databases within the computer infrastructure with the additionally acquired decentralized artificial intelligence/deep learning information obtained;

updating the newly acquired decentralized artificial intelligence/deep learning information obtained to other computer processing modules for additional machine learning and deep learning analysis and storage;

reporting on the machine learning and deep learning analysis and decentralized artificial intelligence/deep learning information obtained using the report module; and archiving the machine learning and deep learning analysis and decentralized artificial intelligence/deep learning information obtained.

10. A computer program product for decentralized artificially intelligent cyber-physical system for standardized production of standardized building modules, the computer program product comprising:

a non-transitory computer-readable medium having executable instructions encoded thereon, such that upon execution of the instructions by one or more processors, the one or more processors perform operations of:

receiving pre-defined objectives according to a master contract, the pre-defined objectives including at least standardized production of one or more standardized building modules;

receiving, from a master knowledge generator, Workforce specific data as related to fulfillment of the pre-defined objectives;

receiving, from an integrated knowledge base, real-property information related to fulfillment of the pre-defined objectives;

generating a standardized work order (STANWO) recommendation for the Workforce based on the Workforce specific data and the real-property information;

receiving production data on the Workforce while the Workforce is executing at least a portion of the STANWO recommendation;

updating an Electronic Building Component Master for the Workforce based on the production data; and causing one or more automated Workforce components to begin physically producing one or more modular components for the one or more building modules based on the STANWO recommendation.

11. The computer program product as set forth in claim 10, wherein causing one or more automated Workforce components to begin physically producing one or more modular components includes an operation selected from a group consisting of causing a robotic system to weld two building components together, cutting building components, geographic movement of one or more building components, and painting one or more building components.

12. The computer program product as set forth in claim 10, further comprising instructions for altering the STANWO based on the production data and causing the one or more automated Workforce components to execute an altered STANWO.

13. The computer program product as set forth in claim 10, wherein the real-property information includes at least some of aggregated and verified geospatial information on jurisdictional zones, property lines, population information, and geospatial regulatory information.

14. The computer program product as set forth in claim 10, wherein the master knowledge generator checks the personalized STANWO recommendation against a regulatory database to ensure regulatory compliance, such that if the STANWO is within regulatory compliance, then generating instructions to cause the one or more automated Workforce components to execute the at least a portion of the STANWO recommendation.

15. The computer program product as set forth in claim 10, further comprising instructions for operating one or more computer process system (CPS) nodes, such that the one or more CPS nodes are operable for monitoring and generating production data for the one or more automated Workforce components.

16. The computer program product as set forth in claim 15, wherein one or more of the CPS nodes are emergency response sensors that, when activated, cause an emergency response system to activate a physical response to mitigate an emergency as sensed by the emergency response sensors.

17. A computer implemented method for a decentralized artificially intelligent cyber-physical system for standardized production of standardized building modules, the method comprising an act of:

causing one or more processors to execute instructions encoded on a non-transitory computer-readable medium, such that upon execution, the one or more processors perform operations of:

receiving pre-defined objectives according to a master contract, the pre-defined objectives including at least standardized production of one or more standardized building modules;

receiving, from a master knowledge generator, Workforce specific data as related to fulfillment of the pre-defined objectives;

receiving, from an integrated knowledge base, real-property information related to fulfillment of the pre-defined objectives;

generating a standardized work order (STANWO) recommendation for the Workforce based on the Workforce specific data and the real-property information;

receiving production data on the Workforce while the Workforce is executing at least a portion of the STANWO recommendation;

updating an Electronic Building Component Master for the Workforce based on the production data; and causing one or more automated Workforce components to begin physically producing one or more modular components for the one or more building modules based on the STANWO recommendation.

* * * * *